United States Patent
Danilov et al.

(10) Patent No.: US 10,931,777 B2
(45) Date of Patent: Feb. 23, 2021

(54) NETWORK EFFICIENT GEOGRAPHICALLY DIVERSE DATA STORAGE SYSTEM EMPLOYING DEGRADED CHUNKS

(71) Applicant: EMC IP Holding Company LLC, Hopkinton, MA (US)

(72) Inventors: Mikhail Danilov, Saint Petersburg (RU); Yohannes Altaye, Dumfries, VA (US)

(73) Assignee: EMC IP HOLDING COMPANY LLC, Hopkinton, MA (US)

( * ) Notice: Subject to any disclaimer, the term of this patent is extended or adjusted under 35 U.S.C. 154(b) by 0 days.

(21) Appl. No.: 16/228,612

(22) Filed: Dec. 20, 2018

(65) Prior Publication Data
US 2020/0204639 A1 Jun. 25, 2020

(51) Int. Cl.
*H04L 29/08* (2006.01)
*G06F 3/06* (2006.01)

(52) U.S. Cl.
CPC .......... *H04L 67/2828* (2013.01); *G06F 3/067* (2013.01); *G06F 3/0608* (2013.01);
(Continued)

(58) Field of Classification Search
CPC ............ H04L 67/1097; H04L 67/2828; H04L 2209/38; H04L 67/10; H04L 67/12; H04L 67/16; H04L 9/0643; H04L 9/3239; G06F 3/0608; G06F 3/0652; G06F 3/0661; G06F 3/067; G06F 16/535; G06F 16/538; G06F 16/54; G06F 16/951; G06F 21/44; G06F 21/45; G06F 21/53; G06F 21/6254; G06F 21/64; G06F 2221/2117; G06K 9/00624; G06T 2207/20084
See application file for complete search history.

(56) References Cited

U.S. PATENT DOCUMENTS 5,675,802 A 10/1997 Allen et al.
5,805,788 A 9/1998 Johnson
(Continued)

OTHER PUBLICATIONS

Non-Final Office Action received for U.S. Appl. No. 15/651,504 dated Mar. 21, 2019, 10 pages.
(Continued)

*Primary Examiner* — Ninos Donabed
(74) *Attorney, Agent, or Firm* — Amin, Turocy & Watson, LLP

(57) ABSTRACT

Determining, in a geographically diverse storage system, a portion of a data chunk that comprises fewer non-relevant fragments of stored user data than the data chunk itself is disclosed, wherein communication of the portion, in lieu of the data chunk, can result in consumption of fewer network resources. Chunk table data that can indicate information about fragments comprising the chunk, such as memory locations of fragments, sizes of fragments, indexes of fragments, a relevancy flag, etc., can be determined and/or stored. In an operation of the geographically diverse storage system, such as generating a convolved chunk, deletion of a chunk, regeneration of a damaged chunk, etc., employing the portion of the data chunk can generally reduce consumption of network resources in comparison to communicating the entire data chunk itself inclusive of all non-relevant fragments.

20 Claims, 10 Drawing Sheets

(52) U.S. Cl.
CPC .......... *G06F 3/0652* (2013.01); *G06F 3/0661* (2013.01); *H04L 67/1097* (2013.01)

(56) References Cited

U.S. PATENT DOCUMENTS

| | | | |
|---|---|---|---|
| 5,950,225 | A | 9/1999 | Kleiman |
| 6,502,243 | B1 * | 12/2002 | Thomas ............. H04N 21/8586 725/110 |
| 7,389,393 | B1 | 6/2008 | Karr et al. |
| 7,577,091 | B2 | 8/2009 | Antal et al. |
| 7,631,051 | B1 | 12/2009 | Fein et al. |
| 7,664,839 | B1 | 2/2010 | Karr et al. |
| 7,680,875 | B1 | 3/2010 | Shopiro et al. |
| 7,721,044 | B1 | 5/2010 | Chatterjee et al. |
| 8,125,406 | B1 * | 2/2012 | Jensen ................ G02B 27/017 345/9 |
| 8,261,033 | B1 | 9/2012 | Slik et al. |
| 8,370,542 | B2 | 2/2013 | Lu et al. |
| 8,479,037 | B1 | 7/2013 | Chatterjee et al. |
| 8,495,465 | B1 | 7/2013 | Anholt et al. |
| 8,751,599 | B2 | 6/2014 | Tran et al. |
| 8,751,740 | B1 | 6/2014 | De Forest et al. |
| 8,799,746 | B2 | 8/2014 | Baker et al. |
| 8,832,234 | B1 | 9/2014 | Brooker et al. |
| 8,856,619 | B1 | 10/2014 | Cypher |
| 8,972,478 | B1 * | 3/2015 | Storer ................... G06F 3/061 709/201 |
| 9,003,086 | B1 | 4/2015 | Schuller et al. |
| 9,052,942 | B1 | 6/2015 | Barber et al. |
| 9,063,838 | B1 | 6/2015 | Boyle et al. |
| 9,098,447 | B1 | 8/2015 | Donlan et al. |
| 9,208,009 | B2 | 12/2015 | Resch et al. |
| 9,218,135 | B2 | 12/2015 | Miller et al. |
| 9,244,761 | B2 | 1/2016 | Yekhanin et al. |
| 9,268,783 | B1 * | 2/2016 | Shilane ............... H03M 7/3091 |
| 9,274,903 | B1 | 3/2016 | Garlapati et al. |
| 9,280,430 | B2 | 3/2016 | Sarfare et al. |
| 9,405,483 | B1 | 8/2016 | Wei et al. |
| 9,477,682 | B1 | 10/2016 | Bent et al. |
| 9,641,615 | B1 | 5/2017 | Robins et al. |
| 9,665,428 | B1 | 5/2017 | Vairavanathan et al. |
| 9,747,057 | B1 | 8/2017 | Ramani et al. |
| 9,817,713 | B2 | 11/2017 | Gupta et al. |
| 9,864,527 | B1 | 1/2018 | Srivastav et al. |
| 9,942,084 | B1 | 4/2018 | Sorenson, III |
| 10,001,947 | B1 | 6/2018 | Chatterjee et al. |
| 10,055,145 | B1 * | 8/2018 | Danilov ................ G06F 3/065 |
| 10,127,234 | B1 | 11/2018 | Krishnan et al. |
| 10,216,770 | B1 | 2/2019 | Kulesza et al. |
| 10,242,022 | B1 | 3/2019 | Jain et al. |
| 10,282,262 | B2 | 5/2019 | Panara et al. |
| 10,289,488 | B1 | 5/2019 | Danilov et al. |
| 10,331,516 | B2 | 6/2019 | Danilov et al. |
| 10,361,810 | B2 | 7/2019 | Myung et al. |
| 10,496,330 | B1 | 12/2019 | Bernat et al. |
| 10,503,611 | B1 | 12/2019 | Srivastav et al. |
| 10,579,490 | B2 | 3/2020 | Danilov et al. |
| 10,613,780 | B1 | 4/2020 | Naeni et al. |
| 10,733,053 | B1 | 8/2020 | Miller et al. |
| 10,797,863 | B2 * | 10/2020 | Chen ..................... G06N 5/022 |
| 2002/0166026 | A1 | 11/2002 | Ulrich et al. |
| 2005/0080982 | A1 | 4/2005 | Vasilevsky et al. |
| 2005/0088318 | A1 * | 4/2005 | Liu ....................... G08G 1/0965 340/902 |
| 2005/0108775 | A1 * | 5/2005 | Bachar ................... G06Q 50/22 725/135 |
| 2005/0140529 | A1 | 6/2005 | Choi et al. |
| 2005/0234941 | A1 | 10/2005 | Watanabe |
| 2006/0047896 | A1 | 3/2006 | Nguyen et al. |
| 2006/0075007 | A1 | 4/2006 | Anderson et al. |
| 2006/0143508 | A1 | 6/2006 | Mochizuki et al. |
| 2006/0265211 | A1 * | 11/2006 | Canniff ................... G10L 25/69 704/210 |
| 2007/0076321 | A1 | 4/2007 | Takahashi et al. |
| 2007/0239759 | A1 | 10/2007 | Shen et al. |
| 2007/0250674 | A1 | 10/2007 | Findberg et al. |
| 2008/0222480 | A1 | 9/2008 | Huang et al. |
| 2008/0222481 | A1 | 9/2008 | Huang et al. |
| 2008/0244353 | A1 | 10/2008 | Dholakia et al. |
| 2008/0320061 | A1 | 12/2008 | Aszmann et al. |
| 2009/0070771 | A1 | 3/2009 | Yuyitung et al. |
| 2009/0113034 | A1 | 4/2009 | Krishnappa et al. |
| 2009/0172464 | A1 | 7/2009 | Byrne et al. |
| 2009/0183056 | A1 | 7/2009 | Aston |
| 2009/0204959 | A1 | 8/2009 | Anand et al. |
| 2009/0240880 | A1 | 9/2009 | Kawaguchi |
| 2009/0259882 | A1 | 10/2009 | Shellhamer |
| 2010/0031060 | A1 | 2/2010 | Chew et al. |
| 2010/0218037 | A1 | 8/2010 | Swartz et al. |
| 2010/0293348 | A1 | 11/2010 | Ye et al. |
| 2010/0332748 | A1 | 12/2010 | Van der Goot et al. |
| 2011/0029836 | A1 | 2/2011 | Dhuse et al. |
| 2011/0106972 | A1 | 5/2011 | Grube et al. |
| 2011/0107165 | A1 | 5/2011 | Resch et al. |
| 2011/0138148 | A1 | 6/2011 | Friedman et al. |
| 2011/0161712 | A1 | 6/2011 | Athalye et al. |
| 2011/0196833 | A1 | 8/2011 | Drobychev et al. |
| 2011/0246503 | A1 | 10/2011 | Bender et al. |
| 2011/0292054 | A1 * | 12/2011 | Boker ..................... G06T 9/001 345/473 |
| 2012/0023291 | A1 | 1/2012 | Zeng et al. |
| 2012/0096214 | A1 | 4/2012 | Lu et al. |
| 2012/0191675 | A1 | 7/2012 | Kim et al. |
| 2012/0191901 | A1 | 7/2012 | Norair |
| 2012/0204077 | A1 | 8/2012 | D'Abreu et al. |
| 2012/0233117 | A1 | 9/2012 | Holt et al. |
| 2012/0311395 | A1 | 12/2012 | Leggette et al. |
| 2012/0317234 | A1 | 12/2012 | Bohrer et al. |
| 2012/0321052 | A1 * | 12/2012 | Morrill ................... H04L 67/18 379/32.01 |
| 2013/0047187 | A1 | 2/2013 | Frazier et al. |
| 2013/0054822 | A1 | 2/2013 | Mordani et al. |
| 2013/0067159 | A1 | 3/2013 | Mehra |
| 2013/0067187 | A1 | 3/2013 | Moss et al. |
| 2013/0088501 | A1 | 4/2013 | Fell |
| 2013/0097470 | A1 | 4/2013 | Hwang et al. |
| 2013/0145208 | A1 | 6/2013 | Yen et al. |
| 2013/0238932 | A1 | 9/2013 | Resch |
| 2013/0246876 | A1 | 9/2013 | Manssour et al. |
| 2013/0290482 | A1 | 10/2013 | Leggette |
| 2013/0305365 | A1 * | 11/2013 | Rubin ................... G06F 21/552 726/23 |
| 2014/0040417 | A1 | 2/2014 | Galdwin et al. |
| 2014/0064048 | A1 | 3/2014 | Cohen et al. |
| 2014/0115182 | A1 | 4/2014 | Sabaa et al. |
| 2014/0164430 | A1 | 6/2014 | Hadjieleftheriou et al. |
| 2014/0164694 | A1 | 6/2014 | Storer |
| 2014/0250450 | A1 * | 9/2014 | Yu ......................... H04N 21/4331 725/19 |
| 2014/0280375 | A1 | 9/2014 | Rawson et al. |
| 2014/0281804 | A1 | 9/2014 | Resch |
| 2014/0297955 | A1 | 10/2014 | Yamazaki et al. |
| 2014/0331100 | A1 | 11/2014 | Dhuse et al. |
| 2014/0358972 | A1 | 12/2014 | Guarrieri et al. |
| 2014/0359244 | A1 | 12/2014 | Chambliss et al. |
| 2014/0380088 | A1 | 12/2014 | Bennett et al. |
| 2014/0380125 | A1 | 12/2014 | Calder et al. |
| 2015/0006846 | A1 | 1/2015 | Youngworth |
| 2015/0074065 | A1 | 3/2015 | Christ et al. |
| 2015/0112951 | A1 | 4/2015 | Narayanamurthy et al. |
| 2015/0134626 | A1 | 5/2015 | Theimer et al. |
| 2015/0142863 | A1 | 5/2015 | Yuen et al. |
| 2015/0178007 | A1 | 6/2015 | Moisa et al. |
| 2015/0186043 | A1 | 7/2015 | Kesselman et al. |
| 2015/0269025 | A1 | 9/2015 | Krishnamurthy et al. |
| 2015/0303949 | A1 | 10/2015 | Jafarkhani et al. |
| 2015/0331766 | A1 | 11/2015 | Sarfare et al. |
| 2015/0370656 | A1 | 12/2015 | Tsafrir et al. |
| 2016/0011935 | A1 | 1/2016 | Luby |
| 2016/0011936 | A1 | 1/2016 | Luby |
| 2016/0055054 | A1 | 2/2016 | Patterson, III et al. |
| 2016/0162378 | A1 | 6/2016 | Garlapati et al. |
| 2016/0169692 | A1 * | 6/2016 | Gupta ................... G01C 21/3469 701/521 |

(56) References Cited

U.S. PATENT DOCUMENTS

| | | |
|---|---|---|
| 2016/0170668 A1 | 6/2016 | Mehra |
| 2016/0217104 A1 | 7/2016 | Kamble et al. |
| 2016/0232055 A1 | 8/2016 | Vairavanathan et al. |
| 2016/0253400 A1 | 9/2016 | McAlister et al. |
| 2016/0277497 A1 | 9/2016 | Bannister et al. |
| 2016/0292429 A1 | 9/2016 | Bannister et al. |
| 2016/0328295 A1 | 11/2016 | Baptist et al. |
| 2016/0357649 A1 | 12/2016 | Karrotu et al. |
| 2016/0371145 A1 | 12/2016 | Akutsu et al. |
| 2016/0378624 A1 | 12/2016 | Jenkins, Jr. et al. |
| 2016/0380650 A1 | 12/2016 | Calder et al. |
| 2017/0003880 A1 | 1/2017 | Fisher et al. |
| 2017/0004044 A1 | 1/2017 | Tormasov et al. |
| 2017/0017671 A1 | 1/2017 | Baptist et al. |
| 2017/0031945 A1 | 2/2017 | Sarab et al. |
| 2017/0097875 A1 | 4/2017 | Jess et al. |
| 2017/0102993 A1 | 4/2017 | Hu et al. |
| 2017/0116088 A1 | 4/2017 | Anami et al. |
| 2017/0187398 A1 | 6/2017 | Trusov |
| 2017/0187766 A1 | 6/2017 | Zheng et al. |
| 2017/0206025 A1 | 7/2017 | Viswanathan |
| 2017/0206135 A1 | 7/2017 | Zeng |
| 2017/0212680 A1 | 7/2017 | Waghulde |
| 2017/0212845 A1 | 7/2017 | Conway |
| 2017/0235507 A1 | 8/2017 | Sinha et al. |
| 2017/0262187 A1 | 9/2017 | Manzanares et al. |
| 2017/0268900 A1* | 9/2017 | Nicolaas ............ G01C 21/3697 |
| 2017/0286516 A1 | 10/2017 | Horowitz et al. |
| 2017/0288701 A1 | 10/2017 | Slik et al. |
| 2017/0344285 A1 | 11/2017 | Choi et al. |
| 2018/0052744 A1 | 2/2018 | Chen et al. |
| 2018/0063213 A1 | 3/2018 | Bevilacqua-Linn et al. |
| 2018/0074881 A1 | 3/2018 | Burden |
| 2018/0121286 A1 | 5/2018 | Sipos |
| 2018/0129417 A1 | 5/2018 | Sivasubramanian et al. |
| 2018/0181324 A1 | 6/2018 | Danilov et al. |
| 2018/0181475 A1 | 6/2018 | Danilov et al. |
| 2018/0181612 A1 | 6/2018 | Danilov et al. |
| 2018/0246668 A1 | 8/2018 | Sakashita et al. |
| 2018/0267856 A1 | 9/2018 | Hayasaka et al. |
| 2018/0267985 A1 | 9/2018 | Badey et al. |
| 2018/0306600 A1* | 10/2018 | Nicolaas ............ G01C 21/3492 |
| 2018/0307560 A1 | 10/2018 | Vishnumolakala et al. |
| 2018/0341662 A1 | 11/2018 | He |
| 2018/0375936 A1 | 12/2018 | Chirammal et al. |
| 2019/0028179 A1 | 1/2019 | Kalhan |
| 2019/0034084 A1 | 1/2019 | Nagarajan et al. |
| 2019/0043201 A1* | 2/2019 | Strong .................... G06K 9/726 |
| 2019/0043351 A1* | 2/2019 | Yang .................... G06F 21/6245 |
| 2019/0050301 A1 | 2/2019 | Juniwal et al. |
| 2019/0065092 A1 | 2/2019 | Shah et al. |
| 2019/0065310 A1 | 2/2019 | Rozas |
| 2019/0114223 A1 | 4/2019 | Pydipaty et al. |
| 2019/0205437 A1* | 7/2019 | Larson .................... G06F 16/27 |
| 2019/0215017 A1 | 7/2019 | Danilov et al. |
| 2019/0220207 A1 | 7/2019 | Lingarajappa |
| 2019/0356416 A1 | 11/2019 | Yanovsky et al. |
| 2019/0384500 A1 | 12/2019 | Danilov et al. |
| 2019/0386683 A1 | 12/2019 | Danilov et al. |
| 2020/0026810 A1 | 1/2020 | Subramaniam et al. |
| 2020/0050510 A1 | 2/2020 | Chien et al. |
| 2020/0104377 A1 | 4/2020 | Earnesty, Jr. et al. |
| 2020/0117556 A1 | 4/2020 | Zou et al. |

OTHER PUBLICATIONS

Final Office Action received for U.S. Appl. No. 15/662,273 dated May 15, 2019, 33 pages.
Non-Final Office Action received for U.S. Appl. No. 15/965,479 dated Apr. 15, 2019, 21 pages.
Non-Final Office Action received for U.S. Appl. No. 15/794,950 dated Jul. 9, 2019, 29 pages.
Final Office Action received for U.S. Appl. No. 15/651,504 dated Sep. 18, 2019, 15 pages.
Non-Final Office Action received for U.S. Appl. No. 15/952,179 dated Sep. 10, 2019, 42 pages.
Office Action dated Nov. 16, 2018 for U.S. Appl. No. 15/662,273, 19 pages.
Final Office Action received for U.S. Appl. No. 16/010,246 dated Mar. 16, 2020, 33 pages.
Final Office Action received for U.S. Appl. No. 15/656,382 dated Apr. 6, 2020, 31 pages.
Non-Final Office Action received for U.S. Appl. No. 15/582,167 dated Sep. 7, 2018, 19 pages.
Non-Final Office Action received for U.S. Appl. No. 15/952,179 dated Apr. 20, 2020, 68 pages.
Wikipedia, "Standard Raid Levels—RAID 6", URL: https://en.wikipedia.org/wiki/Standard_RAID_levels#RAID_6, Oct. 18, 2019, 11 pages.
Non-Final Office Action received for U.S. Appl. No. 15/656,382 dated Nov. 1, 2019, 47 pages.
Final Office Action received for U.S. Appl. No. 15/952,179 dated Nov. 26, 2019, 53 pages.
Non Final Office Action received for U.S. Appl. No. 16/024,314 dated Nov. 25, 2019, 42 pages.
Non-Final Office Action received for U.S. Appl. No. 16/177,278 dated Dec. 2, 2019, 55 pages.
Non-Final Office Action received for U.S. Appl. No. 15/651,504 dated Dec. 31, 2019, 18 pages.
Non-Final Office Action received for U.S. Appl. No. 16/010,246 dated Dec. 5, 2019, 67 pages.
Stonebreaker et al. "Distributed RAID—A New Multiple Copy Algorithm.", IEEE ICDE, 1990, pp. 430-437.
Muralidhar et al. "f4: Facebook's Warm BLOB Storage System", USENIX. OSDI, Oct. 2014, pp. 383-398.
Final Office Action dated Feb. 12, 2020 for U.S. Appl. No. 16/024,314, 29 pages.
Office Action dated Jan. 9, 2020 for U.S. Appl. No. 16/010,255, 31 pages.
Office Action dated Feb. 5, 2020 for U.S. Appl. No. 16/261,551, 30 pages.
Non-Final Office Action received for U.S. Appl. No. 16/209,185 dated Jun. 18, 2020, 22 pages.
Martin Hosken, Developing a Hyper-Converged Storage Strategy for VMware vCloud Director with VMware vSAN, Jan. 2018 (Year: 2018).
Non-Final Office Action received for U.S. Appl. No. 16/261,549 dated Apr. 15, 2020, 22 pages.
Non-Final Office Action received for U.S. Appl. No. 16/374,726 dated Jun. 2, 2020, 47 pages.
Natarajan, RAID 0, RAID 1, RAID 5, RAID 10 Explained with Diagrams, Aug. 10, 2010, thegeekstuff.com (18 pages).
Non-Final Office Action received for U.S. Appl. No. 16/177,285 dated Jul. 22, 2020, 31 pages.
Non-Final Office Action received for U.S. Appl. No. 16/261,547 dated Sep. 3, 2020, 26 pages.
Non-Final Office Action received for U.S. Appl. No. 16/261,548 dated Aug. 21, 2020, 42 pages.
Notice of Allowance received for U.S. Appl. No. 16/261,549 dated Jul. 17, 2020, 40 pages.
Qiang et al., "Dynamics Process of Long-running Allocation/Collection in Linear Storage Space", International Conference on Networking, Architecture, and Storage (NAS 2007), Guilin, 2007, pp. 209-216.
Non-Final Office Action received for U.S. Appl. No. 16/374,725 dated Aug. 19, 2020, 50 pages.
Non-Final Office Action received for U.S. Appl. No. 16/511,161 dated Jul. 10, 2020, 24 pages.
Notice of Allowance received for U.S. Appl. No. 15/862,547 dated Mar. 29, 2019 27 pages.
Non-Final Office Action received for U.S. Appl. No. 15/792,714 dated Apr. 4, 2019, 20 pages.
Final Office Action received for U.S. Appl. No. 15/792,714 dated Sep. 12, 2019, 43 pages.
Wikipedia "Garbage Collection", URL: https://en.wikipedia.org/wiki/Garbage_collection_(computer science) #Availability (Year: 2017) retrieved using the WayBackMachine, Sep. 8, 2017, 8 pages.

(56) References Cited

OTHER PUBLICATIONS

Wikipedia "Erasure code", URL: https://web.archive.org/web/20170908171158/https://en.wikipedia.org/wiki/Erasure_code (Year: 2017), retrieved using the WayBackMachine, Sep. 8, 2017, 5 pages.
Wikipedia "Front and back ends" URL: https://en.wikipedia.org/wiki/Front_and_back_ends (Year:2019), Sep. 6, 2019, 4 pages.
Notice of Allowance received for U.S. Appl. No. 15/792,714 dated Nov. 8, 2019, 31 pages.
Non-Final Office Action received for U.S. Appl. No. 15/791,390 dated Sep. 20, 2019, 27 pages.
Final Office Action received for U.S. Appl. No. 15/791,390 dated Feb. 6, 2020, 29 pages.
Non-Final Office Action received for U.S. Appl. No. 15/791,390 dated Apr. 30, 2020, 48 pages.
Huang et al., "Scale-RS: An Efficient Scaling Scheme for RS-Coded Storage Clusters," in IEEE Transactions on Parallel and Distributed Systems, vol. 26, No. 6, pp. 1704-1717, Jun. 1, 2015.
Non-Final Office Action received for U.S. Appl. No. 16/457,615 dated Jul. 20, 2020, 34 pages.
Office Action received for U.S. Appl. No. 16/177,278, dated Aug. 21, 2020, 53 pages.
Office Action received for U.S. Appl. No. 16/179,486, dated Aug. 13, 2020, 64 pages.
Guo et al., "GeoScale: Providing Geo-Elasticity in Distributed Clouds" 2016 IEEE International Conference on Cloud Engineering, 4 pages.
Guo et al., "Providing Geo-Elasticity in Geographically Distributed Clouds". ACM Transactions on Internet Technology, vol. 18, No. 3, Article 38. Apr. 2018. 27 pages.
Office Action received for U.S. Appl. No. 16/254,073, dated Aug. 18, 2020, 62 pages.
Office Action received for U.S. Appl. No. 16/010,246 dated Jul. 27, 2020 36 pages.
Notice of Allowance received for U.S. Appl. No. 16/240,193, dated May 4, 2020, 46 pages.
Final Office Action received for U.S. Appl. No. 16/177,278, dated May 11, 2020, 53 pages.
Non-Final Office Action received for U.S. Appl. No. 16/231,018 dated May 8, 2020, 78 pages.
Notice of Allowance dated May 11, 2020 for U.S. Appl. No. 16/240,193, 24 pages.
Non-Final Office Action received for U.S. Appl. No. 16/228,624 dated Jun. 24, 2020, 65 pages.
Non-Final Office Action received for U.S. Appl. No. 16/240,272 dated Jun. 29, 2020, 64 pages.
Final Office Action received for U.S. Appl. No. 16/010,255 dated Jul. 23, 2020, 36 pages.
Non-Final Office Action received for U.S. Appl. No. 16/526,142 dated Oct. 15, 2020, 21 pages.
Zhou, et al. "Fast Erasure Coding for Data Storage: A Comprehensive Study of the Acceleration Techniques" Proceedings of the 17th Usenix Conference on File and Storage Technologies (FAST '19), [https://www.usenix.org/conference/fast19/presentation/zhou], Feb. 2019, Boston, MA, USA. 14 pages.
Non-Final Office Action received for U.S. Appl. No. 16/010,255 dated Oct. 29, 2020, 65 pages.
Final Office Action received for U.S. Appl. No. 16/240,272 dated Oct. 27, 2020, 42 pages.
Non-Final Office Action received for U.S. Appl. No. 16/399,902 dated Oct. 28, 2020, 83 pages.
Notice of Allowance received for U.S. Appl. No. 16/374,726 dated Nov. 20, 2020, 78 pages.
Final Office Action received for U.S. Appl. No. 16/228,624 dated Dec. 1, 2020, 63 pages.
Non-Final Office Action received for U.S. Appl. No. 16/570,657 dated Nov. 27, 2020, 75 pages.
Final Office Action received for U.S. Appl. No. 16/177,285 dated Dec. 30, 2020, 61 pages.
Final Office Action received for U.S. Appl. No. 16/511,161 dated Dec. 30, 2020, 61 pages.
Non-Final Office Action received for U.S. Appl. No. 16/399,895 dated Jan. 4, 2021, 64 pages.
Notice of Allowance received for U.S. Appl. No. 16/374,726 dated Jan. 6, 2021, 56 pages.

\* cited by examiner

NETWORK EFFICIENT GEOGRAPHICALLY DIVERSE DATA STORAGE SYSTEM EMPLOYING DEGRADED CHUNKS

TECHNICAL FIELD

The disclosed subject matter relates to data convolution, more particularly, to employing partially filled data blocks, e.g., degraded chunks, in convolution of data blocks among geographically diverse storage devices.

BACKGROUND

Conventional data storage techniques can employ convolution and deconvolution of data to conserve storage space. As an example, convolution can allow data to be packed or hashed in a manner that uses less space than the original data. Moreover, convolved data, e.g., a convolution of first data and second data, etc., can typically be de-convolved to the original first data and second data. One use of data storage is in bulk data storage. Moreover, a first data block from a first data store at a first location can be convolved with a second data block and stored at a second location that is at a geographically different location than the first location. Accordingly, the first data block can be communicated via a communication network as part of the convolution and storage at the second location. Accordingly, it can be desirable to efficiently use a communication network resource, such as by reducing consumption of the network resource.

DETAILED DESCRIPTION

Figure 1:
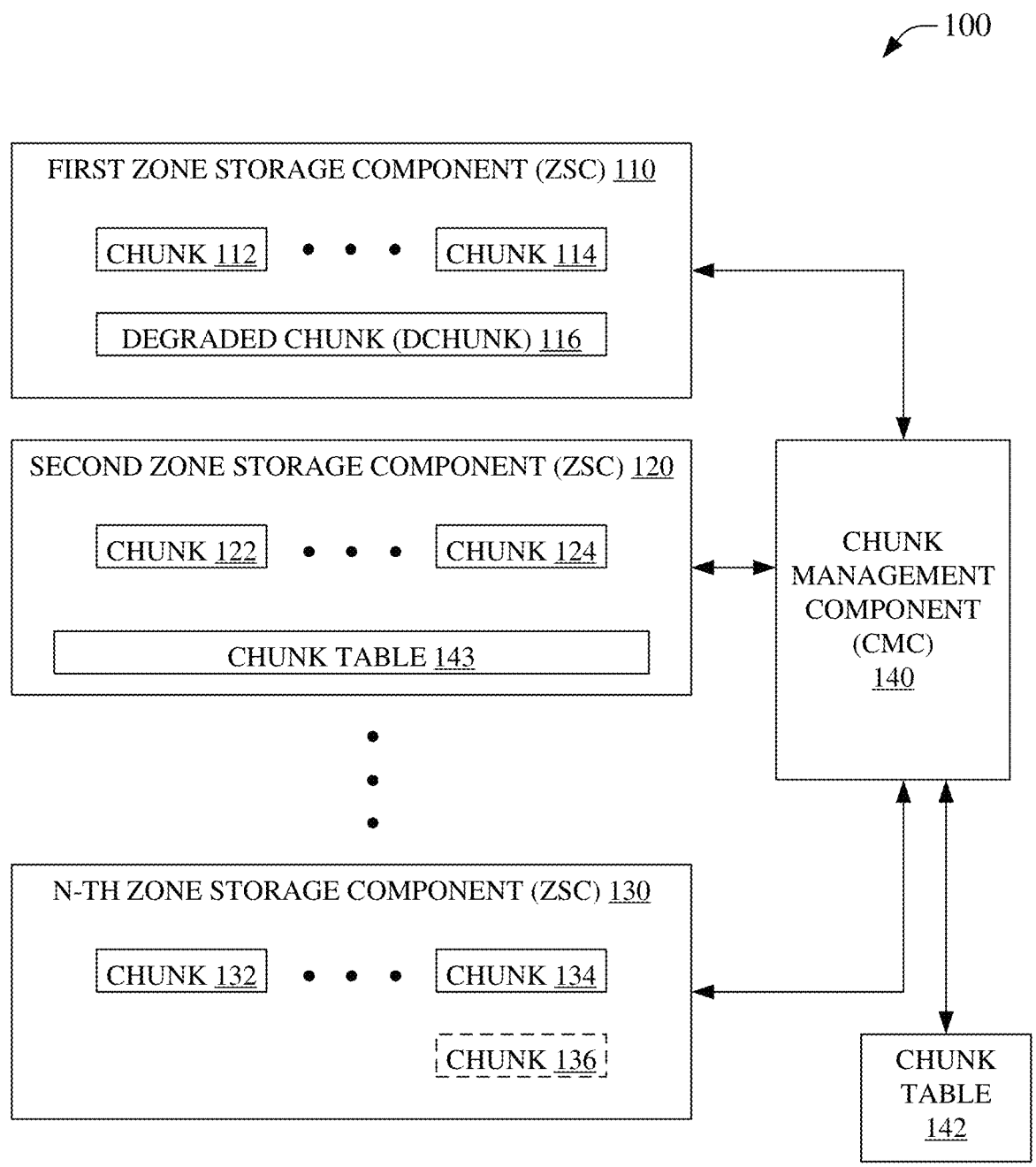
FIG. 1 is an illustration of an example system that can facilitate improved network resource consumption when generating a convolved chunk comprising a representation of a degraded chunk in a geographically diverse storage construct, in accordance with aspects of the subject disclosure.

The subject disclosure is now described with reference to the drawings, wherein like reference numerals are used to refer to like elements throughout. In the following description, for purposes of explanation, numerous specific details are set forth in order to provide a thorough understanding of the subject disclosure. It may be evident, however, that the subject disclosure may be practiced without these specific details. In other instances, well-known structures and devices are shown in block diagram form in order to facilitate describing the subject disclosure.

As mentioned, data storage techniques can employ convolution and deconvolution to conserve storage space. As an example, convolution can allow data to be packed or hashed in a manner that uses less space that the original data. Moreover, convolved data, e.g., a convolution of first data and second data, etc., can typically be de-convolved to the original first data and second data. One use of data storage is in bulk data storage. Examples of bulk data storage can include networked storage, e.g., cloud storage, for example ECS (formerly known as Elastic Cloud Storage) offered by Dell EMC. Bulk storage can, in an aspect, manage disk capacity via partitioning of disk space into blocks of fixed size, frequently referred to as chunks, for example a 128 MB chunk, etc. Chunks can be used to store user data, and the chunks can be shared among the same or different users, for example, one chunk may contain fragments of several user objects. A chunk's content can generally be modified in an append-only mode to prevent overwriting of data already added to the chunk. As such, when a typical chunk becomes full enough, it can be sealed so that the data therein is generally not able for further modification. These chunks can be then stored in a geographically diverse manner to allow for recovery of the data where a first copy of the data is destroyed, e.g., disaster recovery, etc. Blocks of data, hereinafter 'data chunks', or simply 'chunks', can be used to store user data. Chunks can be shared among the same or different users, e.g., a typical chunk can contain fragments of different user data objects. Chunk contents can be modified, for example, in an append-only mode to prevent overwriting of data already added to the chunk, etc. As such, for a typical append-only chunk that is determined to be full, the data therein is generally not able to be further modified. Eventually the chunk can be stored 'off-site', e.g., in a geographically diverse manner, to provide for disaster recovery, etc. Chunks from a data storage device, e.g., 'zone storage component' (ZSC), 'zone storage device' (ZSD), etc., located in a first geographic location, hereinafter a 'zone', etc., can be stored in a second zone storage device that is located at a second geographic location different from the first geographic location. This can enable recovery of data where the first zone storage device is damaged, destroyed, offline, etc., e.g., disaster recovery of data, by accessing the off-site data from the second zone storage device.

Geographically diverse data storage can use data compression to store data. As an example, a storage device in Topeka can store a backup of data from a first zone storage device in Houston, e.g., Topeka can be considered geographically diverse from Houston. As a second example, data chunks from Seattle and San Jose can be stored in Denver. The example Denver storage can be compressed or uncompressed, wherein uncompressed indicates that the Seattle and San Jose chunks are replicated in Denver, and wherein compressed indicates that the Seattle and San Jose chunks are convolved, for example via an 'XOR' operation, into a different chunk to allow recovery of the Seattle or San Jose data from the convolved chunk, but where the convolved chunk typically consumes less storage space than the sum of the storage space for both the Seattle and San Jose chunks individually. In an aspect, compression can comprise convolving data and decompression can comprise deconvolving data, hereinafter the terms compress, compression, convolve, convolving, etc., can be employed interchangeably unless explicitly or implicitly contraindicated, and similarly, decompress, decompression, deconvolve, deconvolving, etc., can be used interchangeably. Compression, therefore, can allow original data to be recovered from a compressed chunk that consumes less storage space than storage of the uncompressed data chunks. This can be beneficial in that data from a location can be backed up by redundant data in another location via a compressed chunk, wherein a redundant data chunk can be smaller than the sum of the data chunks contributing to the compressed chunk. As such, local chunks, e.g., chunks from different zone storage devices, can be compressed via a convolution technique to reduce the amount of storage space used by a compressed chunk at a geographically distinct location.

A convolved chunk stored at a geographically diverse storage device can comprise data from some or all storage devices of a geographically diverse storage system. As an example, where there are five storage devices, a first storage device can convolve chunks from the other four storage devices to create a 'backup' of the data from the other four storage devices. In this example, the first storage device can create a backup chunk from chunks received from the other four storage devices. In an aspect, this can result in generating copies of the four received chunks at the first storage device and then convolving the four chunks to generate a fifth chunk that is a backup of the other four chunks. Moreover, one or more other copies of the four chunks can be created at the first storage device for redundancy. In another example, the first storage device can convolve chunks from three of the other four storage devices.

In an embodiment of the disclosed subject matter, a first data chunk and a second data chunk corresponding to a first and second zone that are geographically diverse can be stored in a third data chunk stored at third zone that is geographically diverse from the first and second zones. In an aspect the third chunk can represent the data of the first and second data chunks in a compressed form, e.g., the data of the first data chunk and the second data chunk can be convolved, such as by an XOR function, into the third data chunk. In an aspect, first data of the first data chunk and second data of the second data chunk can be convolved with or without replicating the entire first data chunk and the entire second data chunk at data store(s) of the third zone, e.g., as at least a portion of the first data chunk and at least a portion of the second data chunk are received at the third zone, they can be convolved to form at least a portion of the third data chunk. In an aspect, where compression occurs without replicating a chunk at another zone prior to compression, this can be termed as 'on-arrival data compression' and can reduce the count of replicate data made at the third zone and data transfers events can correspondingly also be reduced. In an aspect, a ZSC can comprise one or more data storage components that can be communicatively coupled, e.g., a ZSC can comprise one data store, two or more communicatively coupled data stores, etc. In an aspect, this can allow replication of data in the ZSC and can provide data redundancy in the ZSC, for example, providing protection against loss of one or more data stores of a ZSC. As an example, a ZSC can comprise multiple hard drives and a chunk can be stored on more than one hard drive such that, if a hard drive fails, other hard drives of the ZSC can comprise the chunk, or a replicate of the chunk.

In an aspect, a full chunk can be regarded as having 'k' data fragments comprised therein. Accordingly, a degraded chunk can be a partially full chunk, a damaged full chunk, a full chunk comprising stale data, etc., e.g., a degraded chunk can comprise fewer than k relevant data fragments. As an example, a chunk can be sealed before it becomes full. In this example, a storage system can store T data fragments in the chunk having space for 'k' data fragments prior to the chunk being sealed. The remaining 'k–j' data fragments can contain no user data. In an embodiment, the remaining k–j fragment space can comprise formatted or unformatted empty space, e.g., the remaining space can be, for example, formatted to all zeros, formatted to all ones, can be unformatted to comprise a mix of ones and zeros, can be a mix of formatted and unformatted space, etc. This example type of degraded chunk, can be, for example, a result of some ZSC/node failure, a ZSC/node restart, etc. As an example, where a storage system survives a period of instability, the system can produce thousands of poorly filled chunks, such as chunks with just one or two data fragments (j=1 or j=2), etc.

As another example of avenues to degraded chunks, management of chunks can result in chunks that are deemed to comprise less than k relevant data fragments. As an example DELL/EMC's ECS system can implement a quasi-compacting garbage collection that can result in degraded chunks. In the example, quasi-compacting garbage collection process can locate unused or no longer relevant space within chunks, e.g., k-j space, and can reclaim the corresponding capacity for reuse, e.g., using the reclaimed space to create new chunks, etc. With the example quasi-compacting garbage collection process, chunks can gradually degrade, e.g., a chunk can "lose" its data fragments at its beginning, its end, or in the middle. The number of "lost" fragments can grow as time elapses.

In another aspect, as data in chunks becomes stale, old, redundant, etc., which can be related to degradation of chunks into degraded chunks, it can be desirable to delete these chunks to free storage space for other uses. It will be noted that a degraded chunk does not have to be deleted, but that in some instances it can be desirable to delete a degraded chunk, for example, where all representations of relevant data fragments of a degraded chunk can be replicated in a less degraded chunk, it can be desirable to thereafter delete the degraded chunk to consume less data storage space.

In an aspect, a convolved chunk can be de-convolved, partially or completely, to yield other chunks, e.g., the other chunks can represent the same data as the convolved chunk but can typically consume more storage space because these other chunks are less highly convolved. As an example, the chunk (AB(CD)), which can be chunk A convolved with Chunk B convolved with a chunks that itself is a convolution of chunks C and D, can be deconvolved into chunks A to D, into chunks A, B, and (CD), into chunks A and B(CD), etc. Moreover, in this example, because the convolution can be commutative, such as where an XOR function is used to convolve/deconvolve the data, the chunk (AB(CD)) can be deconvolved into, for example, chunks B and A(CD), chunks A, D, and (BC), etc. Where a degraded chunk is stored in a geographically diverse storage system, the convolution/deconvolution relative to the degraded chunk can comprise transfer of chunk data, e.g., via a network, etc., to facilitate the convolution/deconvolution. As an example, where the chunk (ABC) is at a first zone, and chunk D is a degraded chunk at a second zone that is to be convolved with (ABC) at a third zone, data for chunk (ABC) can be communicated via a network, etc., from the first zone to the third zone, and less than all of chunk D, written as chunk D! (which can be pronounced 'dee-bang') can be communicated via the network from the second zone to the third zone to allow for convolution, e.g., (ABC) XOR (D!), resulting in chunk (ABCD) at the third zone because the data represented in D! fully represents the relevant data of degraded chunk D. In this example, communicating less than chunk D, e.g., communicating just chunk D!, can consume less network resources than communicating all of chunk D via the network, e.g., communicating irrelevant portions of chunk D can be considered wasteful consumption of the network resources. Correspondingly, where D is to be deleted from (ABCD), then chunk D!, e.g., less than all of chunk D, can be communicated to facilitate the deletion of chunk D data representations from (ABCD) and resulting in chunk (ABC) with less consumption of network resources than would have occurred if all of chunk D, e.g., including relent data, were communicated to enable the deletion event. It will be noted that in addition to reducing network resource consumption, fewer processor resources, volatile memory resources, energy consumption, etc., can also result from not communicating an irrelevant portion of a degraded chunk in relation to geographically diverse data storage system events. As such, it can be desirable to reduce resource consumption in communicating chunks between zones to where degraded chunk are involved.

In an aspect, compression/convolution of chunks can be performed by different compression/convolution technologies. Logical operations can be applied to chunk data to allow compressed data to be recoverable, e.g., by reversing the logical operations to revert to an earlier form of chunk data. As an example, data from chunk 1 can undergo an exclusive-or operation, hereinafter 'XOR', with data from chunk 2 to form chunk 3. This example can be reversed by XORing chunk 3 with chunk 2 to generate chunk 1, etc. While other logical and/or mathematical operations can be employed in compression of chunks, those operations are generally beyond the scope of the presently disclosed subject matter and, for clarity and brevity, only the XOR operator will be illustrated herein. However, it is noted that the disclosure is not so limited and that those other operations or combinations of operations can be substituted without departing from the scope of the present disclosure. As such, all logical and/or mathematical operations for compression germane to the disclosed subject matter are to be considered within the scope of the present disclosure even where not explicitly recited for the sake of clarity and brevity.

In an aspect, the presently disclosed subject matter can include 'zones'. A zone can correspond to a geographic location or region. As such, different zones can be associated with different geographic locations or regions. As an example, Zone A can comprise Seattle, Wash., Zone B can comprise Dallas, Tex., and, Zone C can comprise Boston, Mass. In this example, where a local chunk from Zone A is replicated, e.g., compressed or uncompressed, in Zone C, an earthquake in Seattle can be less likely to damage the replicated data in Boston. Moreover, a local chunk from Dallas can be convolved with the local Seattle chunk, which can result in a compressed/convolved chunk, e.g., a partial or complete chunk, which can be stored in Boston. As such, either the local chunk from Seattle or Dallas can be used to de-convolve the partial/complete chunk stored in Boston to recover the full set of both the Seattle and Dallas local data chunks. The convolved Boston chunk can consume less disk space than the sum of the Seattle and Dallas local chunks. An example technique can be "exclusive or" convolution, hereinafter 'XOR', '$\oplus$', etc., where the data in the Seattle and Dallas local chunks can be convolved by XOR processes to form the Boston chunk, e.g., C=A1 $\oplus$B1, where A1 is a replica of the Seattle local chunk, B1 is a replica of the Dallas local chunk, and C is the convolution of A1 and B1. Of further note, the disclosed subject matter can further be employed in more or fewer zones, in zones that are the same or different than other zones, in zones that are more or less geographically diverse, etc. As an example, the disclosed subject matter can be applied to data of a single disk, memory, drive, data storage device, etc., without departing from the scope of the disclosure, e.g., the zones represent different logical areas of the single disk, memory, drive, data storage device, etc. Moreover, it will be noted that convolved chunks can be further convolved with other data, e.g., D=C1 $\oplus$E1, etc., where E1 is a replica of, for example, a Miami local chunk, E, C1 is a replica of the Boston partial chunk, C, from the previous example and D is an XOR of C1 and E1 located, for example, in Fargo.

In an aspect, XORs of data chunks in disparate geographic locations can provide for de-convolution of the XOR data chunk to regenerate the input data chunk data. Continuing a previous example, the Fargo chunk, D, can be de-convolved into C1 and E1 based on either C1 or D1; the Miami chunk, C, can be de-convolved into A1 or B1 based on either A1 or B1; etc. Where convolving data into C or D comprises deletion of the replicas that were convolved, e.g., A1 and B1, or C1 and E1, respectively, to avoid storing both the input replicas and the convolved chunk, de-convolution can rely on retransmitting a replica chunk that so that it can be employed in de-convoluting the convolved chunk. As an example the Seattle chunk and Dallas chunk can be replicated in the Boston zone, e.g., as A1 and B1. The replicas, A1 and B1 can then be convolved into C. Replicas A1 and B1 can then be deleted because their information is redundantly embodied in C, albeit convolved, e.g., via an XOR process, etc. This leaves only chunk C at Boston as the backup to Seattle and Dallas. If either Seattle or Dallas is to be recovered, the corollary input data chunk can be used to de-convolve C. As an example, where the Seattle chunk, A, is corrupted, the data can be recovered from C by de-convolving C with a replica of the Dallas chunk B. As such, B can be replicated by copying B from Dallas to Boston as B1, then de-convolving C with B1 to recover A1, which can then be copied back to Seattle to replace corrupted chunk A.

In some circumstances, disk space management can seek to recover underutilized disk space. As an example, where the Seattle chunk, A, is to be deleted, recovery of the Dallas chunk, B, via Boston convolved chunk, C, becomes dependent on having a copy of B to de-convolve C with after A has been deleted. As such, it can be desirable to de-convolve C into A1 and B1 prior to deleting A and A1, such that B1 can be convolved with another chunk, for example Miami chunk, E. As such, recovery of B1 can be based on E1 and the XOR of B1E1. Also of note, to de-convolve C in to A1 and B1, a replica of A, e.g., A1 is made in Boston, this allows recovery of B1. Once B1 is recovered, C, A1, and A can be deleted. Then B1 can be convolved with E1. It will be noted that data is transferred, e.g., A is copied into A1 from Seattle to Boston, to allow C to be de-convolved.

To the accomplishment of the foregoing and related ends, the disclosed subject matter, then, comprises one or more of the features hereinafter more fully described. The following description and the annexed drawings set forth in detail certain illustrative aspects of the subject matter. However, these aspects are indicative of but a few of the various ways in which the principles of the subject matter can be employed. Other aspects, advantages, and novel features of the disclosed subject matter will become apparent from the following detailed description when considered in conjunction with the provided drawings.

FIG. 1 is an illustration of example system 100, which can facilitate improved network resource consumption when generating a convolved chunk comprising a representation of a degraded chunk in a geographically diverse storage construct, in accordance with aspects of the subject disclosure. System 100 can comprise zone storage components (ZSCs), e.g., first ZSC 110, second ZSC 120, N-th ZSC 130, etc. The ZSCs can communicate with the other ZSCs of system 100. A zone can correspond to a geographic location or region. As such, different zones can be associated with different geographic locations or regions. A ZSC can comprise one or more data stores in one or more locations. In an aspect, a ZSC can store at least part of a data chunk on at least part of a data storage device, e.g., hard drive, flash memory, optical disk, server storage, etc. Moreover, a ZSC can store at least part of one or more data chunks on one or more data storage devices, e.g., on one or more hard disks, across one or more hard disks, etc. As an example, a ZSC can comprise one or more data storage devices in one or more data storage centers corresponding to a zone, such as a first hard drive in a first location proximate to Miami, a second hard drive also proximate to Miami, a third hard drive proximate to Orlando, etc., where the related portions of the first, second, and third hard drives correspond to, for example, a 'Florida zone', 'Southeastern United States zone', etc.

In an aspect, data chunks can be replicated in their source zone, in a geographically diverse zone, in their source zone and one or more geographically diverse zones, etc. As an example, a Seattle zone can comprise a first chunk that can be replicated in the Seattle zone to provide data redundancy in the Seattle zone, e.g., the first chunk can have one or more replicated chunks in the Seattle zone, such as on different storage devices corresponding to the Seattle zone, thereby providing data redundancy that can protect the data of the first chunk, for example, where a storage device storing the first chunk or a replicate thereof becomes compromised, the other replicates (or the first chunk itself) can remain uncompromised. In an aspect, data replication in a zone can be on one or more storage devices, e.g., a chunk can be stored on a first data storage device, a second chunk can be stored on a second storage device, and a third chunk can be stored on a third storage device, wherein the first, second, and third storage devices correspond to the first zone, and wherein the first, second, and third storage devices can be the same storage device or different storage devices. Replication of chunks, e.g., the first chunk, into other chunks can comprise communicating data, e.g., over a network, bus, etc., to other data storage locations on the first, second, and third storage devices and, moreover, can consume data storage resources, e.g., drive space, etc., upon replication. As such, the number of replicates can be based on balancing resource costs, e.g., network traffic, processing time, cost of storage space, etc., against a level of data redundancy, e.g., how much redundancy is needed to provide a level of confidence that the data/replicated data will be available. In an aspect, replication of chunks can enable deconvolution of convolved chunks at another zone(s). Deconvolution of a convolved chunk, for example, can facilitate creation of a convolved chunk, deletion of data from a convolved chunk, recovery of a lost/inaccessible chunk, etc. Accordingly, it can be desirable to reduce resource consumption, e.g., reduce data communicated to replicate relevant portions of chunks between zones or between devices of a zone, so that less bandwidth, less storage, etc., is consumed during geographically diverse storage system events.

A geographically diverse storage system, e.g., a system comprising system 100, can replicate chunks from a first ZSC at another ZSC as part of generating a convolved chunk, e.g., generating convolved chunk 136 at N-th ZSC 130 based on representations of chunks form first ZSC 110 and/or second ZSC 120, etc., e.g., chunks 112-114, degraded chunk (dchunk) 116, chunks 122-124, chunks 132-134, etc.

In an embodiment, chunks can be managed by chunk management component (CMC) 140. CMC 140 can facilitate convolving chunks from one or more ZSCs at another ZSC. As an example, CMC 140 can facilitate convolving dchunk 116 with chunk 124 to form chunk 136 at ZSC 130. Data can be stored on a storage device of a corresponding ZSC, and can be affiliated with an index, location, address, etc., of the data on the storage device of the ZSC. As an example, chunk 124 can be associated with a physical memory element of a hard drive of ZSC 120 that can store the data of chunk 124. In this example, the chunk can be affiliated with a starting address, an ending address, an intermediate address, etc. In an aspect, an intermediate address can correspond to fragments of the chunk, such as where, for example, chunk 124 comprises twelve chunk fragments, chunk 124 can be affiliated with a starting address, eleven intermediate addresses corresponding to the start of the second through twelfth fragment of the chunk, an ending address, etc. Accordingly, operations can be performed relative to the addresses of the fragments of example chunk 124, e.g., the fragments of chunk 124 can be accessed by an index. In some embodiments, the fragments can be of fixed size such that a fragment can be accessed based on a starting address and a number of indexed jumps to the desired fragment, e.g., for accessing a third fragment of fixed size B and a starting address of A, the address of the third fragment can be A+3B, etc., because the third fragment is stored three units B into the chunk which starts at address A. Nearly any addressing or indexing schema can be employed within the scope of the instant disclosure and therefore all such addressing schema, even where not explicitly recited for the sake of clarity and brevity, are considered within the scope of the instant disclosure.

In an embodiment, a chunk, as disclosed herein, can comprise non-relevant data, can comprise empty formatted data, can comprise empty unformatted data, etc. As an example, dchunk 116 can comprise one relevant fragment at a second index and eleven non-relevant fragments that can be formatted to 'zero', e.g., the starting fragment of dchunk 116 can be all zeros, the second fragment of dchunk 116 can comprise relevant data, and the third to twelfth fragment of dchunk 116 can comprise all zeros. In this example, convolution, such as by an XOR operation, with another chunk than has twelve relevant fragments, such as chunk 124, etc., can result in a third chunk, such as chunk 136, that has twelve relevant fragments. However, in this example, where only the second fragment of dchunk 116 has values other than zero, the example XOR operation can result in chunk 136 having the first fragment and third to twelfth fragments thereof being the same as the corresponding fragments of chunk 124 and the second fragment of example chunk 136 having values based on an XOR of the second fragment of dchunk 116 with the second fragment of chunk 124. As such, it can be observed that communication of the first and third through twelfth fragments of dchunk 116 in this example can be unnecessary because these fragments do not alter the resulting combined chunk, e.g., example chunk 136.

Accordingly, CMC 140 can cause relevant portions of dchunk 116 to be communicated, thereby reducing network resource consumption in contrast to communicating all of dchunk 116. In an aspect, the communication of relevant portions of dchunk 116 can comprise communication of all, some, or none of dchunk 116. In a further aspect, the communication of relevant portions of dchunk 116 can comprise communication of only relevant portions, communication of some relevant and some non-relevant portions, communication of all relevant portions and some non-relevant portions, communication of all relevant and all non-relevant portions, etc. As an example, where a second and fourth fragment of dchunk 116 are relevant and the first, third, and fifth through twelfth fragments of dchunk 116 are non-relevant, CMC 140 can cause communication of only the second fragment, only the second and fourth fragment, only the second through fourth fragment inclusive of the third fragment, only the first through fourth fragment inclusive of the second and third fragments, etc. In an aspect, selection of which fragments to communicate can be based on fragment selection rules. An example fragment selection rule, for example, can be to communicate all chunk data beginning at the starting address up to the address of the first non-relevant fragment address occurring after the last relevant fragment address. In this example, where example dchunk 116 has relevant fragments at the second and fourth fragment, the rule can result in communicating the first through fourth fragments inclusive of the non-relevant fragment at the first and third fragment addresses of dchunk 116. This example rule can simplify tracking of relevant data fragments during network communication, for example, by allowing communication of fragments without any reference to indexes of the relevant and/or non-relevant fragments because all communications under this example rule begin at the starting address of dchunk 116, the fragments are of fixed size, and the balance of dchunk 116 that is not communicated, e.g., the fifth through twelfth fragments, can simply be zero padded at the destination. As an example, where dchunk 116 comprises twelve three-bit fragments, for ease of illustration only—typically fragments will be substantially more fragments and/or bits in size, has zero formatted non-relevant fragments, and has relevant fragments at the second and fourth indexes, this example dchunk 116 can be represented as: 000-011-000-111-000-000-000-000-000-000-000-000. CMC 140 can cause communication of the relevant portions, such as by the preceding example selection rule, of 000-011-000-111, thereby consuming about 12 bits of network resource for the data in comparison to using about 36 bits for the data where all of dchunk 116 is communicated. In this example, the communicated portion of dchunk 116 can be employed for convolution with another chunk, e.g., chunk 124, etc., to form a third chunk, e.g., chunk 136, etc., without need for address or index information because the communicated portion is selected to begin at the starting address of the example dchunk 116 and all non-communicated fragments can be determined to be zero value bits because of the application of the selection rule and to zero-formatted non-relevant fragment bits. As such, where example chunk 124 is can be 111-000-101-111-...-111, then example chunk 136 can be 111, 011, 101, 000-...-111, where '000' XOR '111'='111,' '011' XOR '000'='011,' '000' XOR '101'='101,' '111' XOR '111'='000,' etc.

In another example, CMC 140 can similarly cause relevant portions of dchunk 116 to be communicated, thereby reducing network resource consumption in contrast to communicating all of dchunk 116, by communication of different portions of dchunk 116 than in the previous example. Again, where a second and fourth fragment of dchunk 116 are relevant and the first, third, and fifth through twelfth fragments of dchunk 116 are non-relevant, CMC 140 can cause communication of only the second fragment through fourth fragment, according to a different selection rule, for example, a selection rule that begins at the first relevant fragment address and up to the address of the first non-relevant fragment address occurring after the last relevant fragment address. In this example, where example dchunk 116 has relevant fragments at the second and fourth fragment, the rule can result in communicating the second through fourth fragments inclusive of the non-relevant fragment at the third fragment addresses of dchunk 116. This example rule can allow communication of fragments with a reference to a beginning index and ending index of the relevant fragments allowing subsequent storage system operations to be performed on the correct fragments while still communicating less than the full data of dchunk 116, e.g., the first and the fifth through twelfth fragments do not need to be communicated under this example selection rule. As an example, where dchunk 116 comprises twelve three-bit fragments, has zero formatted non-relevant fragments, and has relevant fragments at the second and fourth indexes, this example dchunk 116 can again be represented as: 000-011-000-111-000-000-000-000-000-000-000-000.

CMC 140 can cause communication of the relevant portions, such as by the this second selection rule, of 011-000-111 and data indicating that the fragments correspond to the second through fourth fragment indexes, thereby consuming about 9 bits of network resource for the data and a bit more data for the indexing data, in comparison to using about 36 bits for the data where all of dchunk 116 is communicated. In this example, the communicated portion of dchunk 116 can be employed for convolution with another chunk, e.g., chunk 124, etc., to form a third chunk, e.g., chunk 136, etc. As such, where example chunk 124 is can be 111-000-101-111-... -111, then example chunk 136 can be 111, 011, 101, 000-...-111, where '011' XOR '000'='011,' '000' XOR '101'='101,' '111' XOR '111'='000,' etc., given that CMC 140 can indicate that the first fragment of the communicated portion of dchunk 116 in this example corresponds to the second fragment of chunk 124, the second fragment of the communicated portion of dchunk 116 in this example corresponds to the third fragment of chunk 124, the third fragment of the communicated portion of dchunk 116 in this example corresponds to the fourth fragment of chunk 124, etc.

In a further example, CMC 140 can again similarly cause relevant portions of dchunk 116 to be communicated, thereby reducing network resource consumption in contrast to communicating all of dchunk 116, by communication of still different portions of dchunk 116 than in the previous two examples. Again, where a second and fourth fragment of dchunk 116 are relevant and the first, third, and fifth through twelfth fragments of dchunk 116 are non-relevant, CMC 140 can cause communication of only the second fragment and fourth fragment, according to a third example selection rule, for example, a selection rule that selects only relevant fragments and provides addressing information allowing them to be paired up with fragments from other chunks in data storage system operations. In this example, where example dchunk 116 has relevant fragments at the second and fourth fragment, the rule can result in communicating the second and fourth fragments while excluding communication of the non-relevant fragment at the first, third, and fifth through twelfth fragment addresses of dchunk 116. This example rule can allow communication of fragments with a reference to an index of each of the relevant fragments allowing subsequent storage system operations to be performed on the correct fragments while still communicating less than the full data of dchunk 116, e.g., the first, third, and the fifth through twelfth fragments do not need to be communicated under this example selection rule. As an example, where dchunk 116 comprises twelve three-bit fragments, has zero formatted non-relevant fragments, and has relevant fragments at the second and fourth indexes, this example dchunk 116 can again be represented as: 000-011-000-111-000-000-000-000-000-000-000-000. CMC 140 can cause communication of the relevant portions, such as by the this third selection rule, of 011-111 and data indicating that the fragments correspond to the second and fourth fragment indexes, thereby consuming about 6 bits of network resource for the data and a bit more data for the indexing data, in comparison to using about 36 bits for the data where all of dchunk 116 is communicated. In this example, the communicated portion of dchunk 116 can be employed for convolution with another chunk, e.g., chunk 124, etc., to form a third chunk, e.g., chunk 136, etc. As such, where example chunk 124 is can be 111-000-101-111- . . . -111, then example chunk 136 can be 111, 011, 101, 000- . . . -111, where '011' XOR '000'='011' and '111' XOR '111'='000,' etc., given that CMC 140 can indicate that the first fragment of the communicated portion of dchunk 116 in this example corresponds to the second fragment of chunk 124, the second fragment of the communicated portion of dchunk 116 in this example corresponds to the fourth fragment of chunk 124, etc.

In an aspect, system 100 can comprise chunk table 142 that can communicate with CMC 140 to index addresses of chunk data. In an aspect, chunk table 142 can indicate relevant and non-relevant data fragments, chunks, addresses, indexes, etc., related to identifying relevant and/or non-relevant portions of chunks. In an embodiment, chunk table 142 can be located at a location remote from a ZSC and/or remote from CMC 140. In an embodiment, chunk table 142 can be located at a location local to a ZSC and/or local to CMC 140. In some embodiments chunk table 142 can be comprised in CMC 140. In some embodiments, one or more ZSC can comprise a chunk table, e.g., chunk table 143. As an example, each ZSC can comprise a chunk table, e.g., chunk table 143, which can facilitate indicating relevant and/or non-relevant portions of a chunk. In an aspect, chunk table 143 can facilitate indicating relevant and/or non-relevant portions of a chunk stored at second ZSC 120, can facilitate indicating relevant and/or non-relevant portions of a chunk stored at another ZSC such as dchunk 116 of first ZSC 110, etc. CMC 140 can access an indication of relevancy and/or non-relevancy of a portion of a chunk via chunk table 142, chunk table 143, etc., to facilitate selecting data to be communicated to support an operation of a geographically diverse storage system in a manner than can reduce network resource consumption relative to comparably communicating all portions of a chunks affiliated with the operation.

Figure 2:
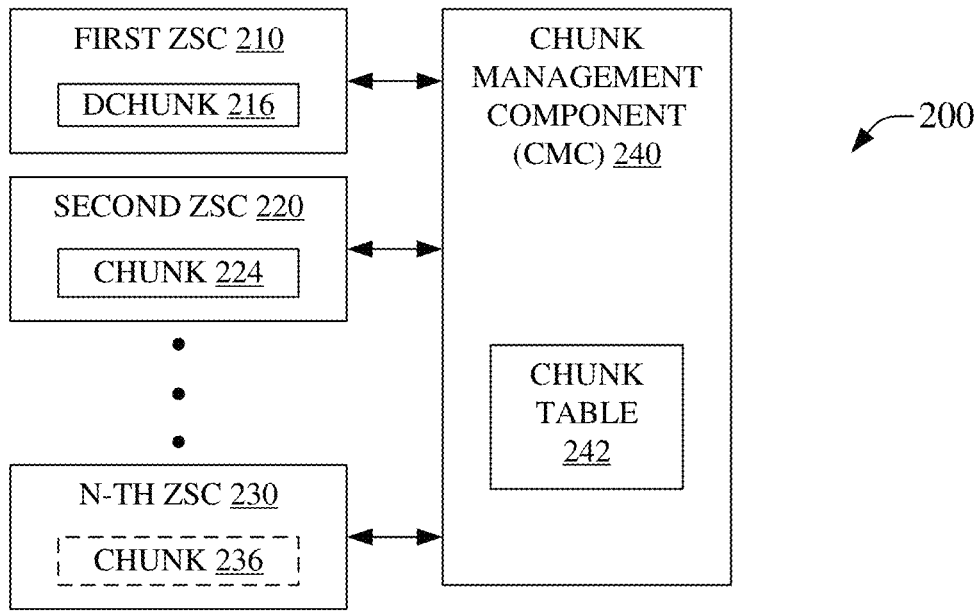
FIG. 2 is an illustration of an example system that can facilitate reducing network resource consumption via employing a chunk table when generating a convolved chunk comprising a representation of a degraded chunk in a geographically diverse storage construct, in accordance with aspects of the subject disclosure.
Figure 2:
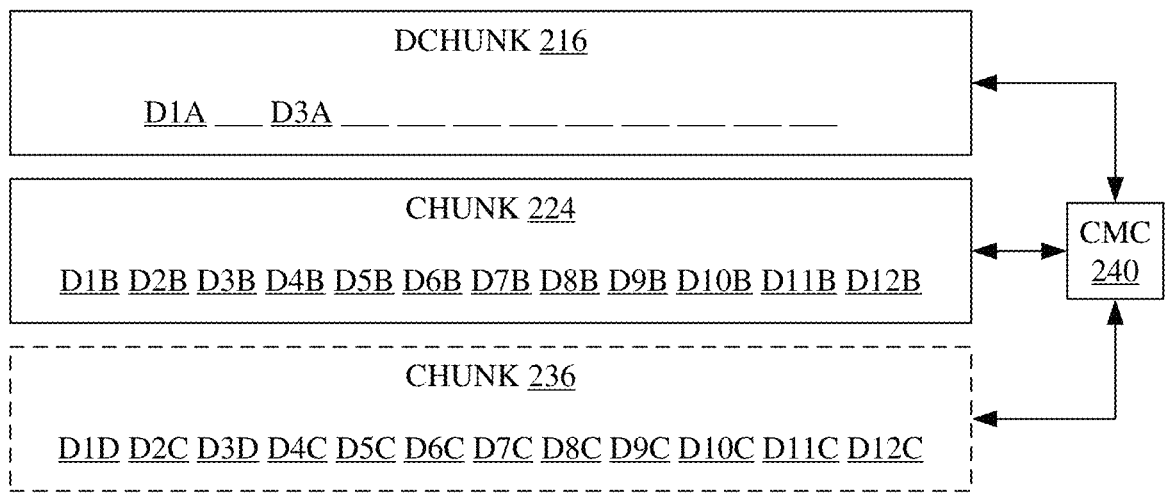

FIG. 2 is an illustration of an example system 200, which can enable reducing network resource consumption via employing a chunk table when generating a convolved chunk comprising a representation of a degraded chunk in a geographically diverse storage construct, in accordance with aspects of the subject disclosure. System 200, in an embodiment, can facilitate convolving a communicated replica of dchunk 216 data, e.g., representing the data of some, none, or all of dchunk 216, etc., from first ZSC 210 and a communicated replica of chunk 224 from second ZSC 220 into chunk 236 at N-th ZSC 230. As such, chunk 236 can represent the data comprised in dchunk 216 and chunk 224. Moreover, chunk 236 can consume less storage space than the sum of space used by dchunk 216 and chunk 224, and therefore in comparison to simply replicating dchunk 216 and chunk 224 at N-th ZSC 230, the use of chunk 236 can also consume less storage space at N-th ZSC 230. In an aspect, dchunk 216 can comprise relevant and irrelevant user data, can be the same size as a non-degraded chunk, can be smaller than a non-degraded chunk, etc. In an aspect, system 200 can comprise communicating data representing relevant user data of dchunk 216, e.g., not communicating non-relevant user data of dchunk 216. System 200 is illustrative of example data fragments comprising dchunk 216, chunk 224, and chunk 236, for example, dchunk 216 can comprise fragment D1A at a first indexed location of the chunk structure and fragment D3A at a third indexed memory location of the chunk structure and the remaining indexed locations of the chunk structure can comprise non-relevant data, chunk 224 can comprise fragments D1B through D12B and no non-relevant data, chunk 236 can comprise fragments D1D, D2C, D3D, and D4C-D12C and no non-relevant data, etc. Where chunk 236 is a convolution of dchunk 216 and chunk 224, D2C and D4C-D12C can be the same representation as D2B and D4B-D12B because convolution of these representations with the non-relevant portions of dchunk 216 can yield a simple copy of chunk 224 at the corresponding indexed chunk structure locations, e.g., D2C=($\oplus$D2B)=D2B. Moreover, where chunk 236 is a convolution of dchunk 216 and chunk 224, D1D can be equivalent to (D1A$\oplus$D1B) and D3D can be equivalent to (D3A$\oplus$D3B).

In an example, CMC 240 can similarly cause relevant portions of dchunk 216 to be communicated, thereby reducing network resource consumption in contrast to communicating all of dchunk 216. In an aspect, CMC 240 can cause communication of only the first fragment through third fragment, the first and third fragment, etc., according to a determined selection rule. In an aspect, CMC 240 can indicate what data is to be communicated based on chunk information, fragment information, address information, index information, relevancy flag information, etc., that can be stored in chunk table 242, etc. In some embodiments, information about fragment relevancy, addresses, indexes, etc., can be determined from sources other than chunk table 242, for example, where a chunk itself comprises data indicating relevancy of fragments, fragment addresses, sizes, indexes, etc.

In system 200, an example selection rule can indicate that data to be communicated, based on information from chunk table 242, etc., begins at the first fragment address through the address of the first non-relevant fragment address occurring after the last relevant fragment address. Under this example selection rule, where example dchunk 116 has relevant fragments at the first and third fragment, the example selection rule can result in communicating the first through third fragments inclusive of the non-relevant fragment at the second fragment addresses of dchunk 116. This example selection rule can allow communication of fragments without reference to an index of the relevant fragments while still allowing subsequent storage system operations to be performed on the correct fragments and still communicating less than the full data of dchunk 116. As an example, dchunk 116 can be a 128 MB chunk, and the data storage system can employ an example 12+4 protection scheme, which can result in a 128 MB chunk comprising twelve 8 MB fragments of user data plus four 8 MB fragments of protection data. In is noted that other protection schema are also readily employable without departing form the disclosed subject matter and, even where not recited for clarity and brevity, all such protection schemes are to be considered within the scope of the present disclosure. As such, where example dchunk 116 comprises twelve 8 MB fragments, has zero formatted non-relevant fragments, and has relevant fragments at the first and third fragment indexes, this example dchunk 116 can be represented as: D1A-000-D3A 000 000 000 000 000 000-000-000. CMC 140 can cause communication of the relevant portions, for example, of D1A-000 . . . 000-D3A, thereby consuming fewer network resources, e.g., about 3×8 MB=24 MB than communicating the full 128 MB of dchunk 116. In this example, the communicated portion of dchunk 116 can be employed for convolution with another chunk, e.g., chunk 124, etc., to form a third chunk, e.g., chunk 136, etc. As such, where example chunk 124 is can be D1B through D12B, then example chunk 136 can be (D1A⊕D1B), D2B, (D3A⊕D3B), D4B, . . . , D12B, which can be written as D1D, D2C, D3D, D4C, . . . , D12C, where D1D=D1A⊕D1B and D3D=D3A⊕D3B.

Figure 3:
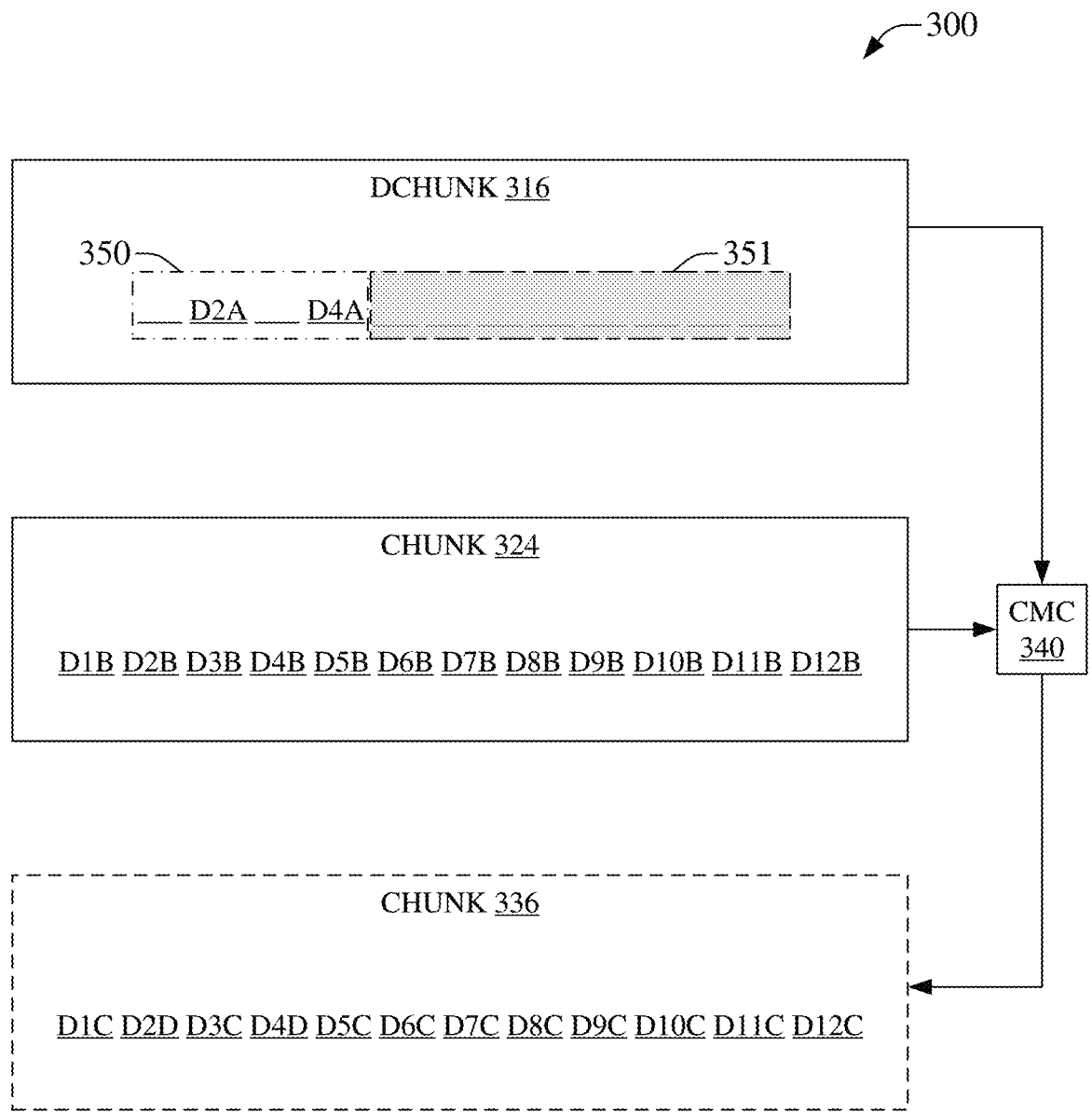
FIG. 3 is an illustration of an example system that can enable reducing network resource consumption based on at least one index of a degraded chunk when generating a convolved chunk comprising a representation of the degraded chunk in a geographically diverse storage construct, in accordance with aspects of the subject disclosure.

FIG. 3 is an illustration of an example system 300, which can facilitate reducing network resource consumption based on at least one index of a degraded chunk when generating a convolved chunk comprising a representation of the degraded chunk in a geographically diverse storage construct, wherein the convolved data represents a group of more than two data chunks, in accordance with aspects of the subject disclosure. System 300 can, comprise dchunk 316, chunk 324, and chunk 336. CMC 340 can enable communicating some, none, or all data representing the content of a chunk/dchunk, which can result in consuming fewer network resources than would be consumed by communicating full chunks/dchunks. In an aspect, dchunk 316 can comprise relevant data, e.g., at the second and fourth example fragments, and irrelevant user data, e.g., at the first, third, and fifth through twelfth example fragments. In an aspect, system 300 can comprise communicating data representing relevant user data of dchunk 316 while communicating less non-relevant user data of dchunk 316.

In an example, CMC 340 can cause relevant portions of dchunk 316 to be communicated with less non-relevant portions of dchunk than might occur if all of dchunk 316 were communicated, thereby reducing network resource consumption. In an example, CMC 340 can cause communication of the first fragment through fourth fragment, the based on an example selection rule. The example selection rule can indicate that data to be communicated begins at the first fragment address and continues through the address of the address resulting from adding the fourth fragment address with the size of the fourth fragment. Under this example selection rule, where example dchunk 116 has relevant fragments at the second and fourth fragment, the example selection rule can result in communicating the first through fourth fragments inclusive of the non-relevant fragment at the first and third fragment addresses of dchunk 116.

Where dchunk 116, for example, can be a 128 MB chunk, and the data storage system can employ an example 12+4 protection scheme, dchunk 116 can comprise twelve 8 MB fragments. In an aspect, the non-relevant fragments can be, for example, zero-formatted, one-formatted, unformatted, etc. As such, this example dchunk 116 can be represented as: _-D2A-_-D4A-_-_- . . . -_. CMC 140 can cause communication of the relevant portions, e.g., portion 350, which can comprise, for example, _-D2A-_-D4A, thereby consuming fewer network resources, than communicating the full dchunk 116. In this example, the communicated portion of dchunk 116 can be employed for convolution with another chunk, e.g., chunk 124, etc., to form a third chunk, e.g., chunk 136, etc. As such, where example chunk 124 is can be D1B through D12B, then example chunk 136 can be (_⊕D1B), (D2A⊕D2B), (_D3B), (D4A⊕D4B), D5B, . . . , D12B, which can be written as D1C, D2D, D3C, D4D, D5C, . . . , D12C. It will be noted that where is zero-formatted, D1C=D1B and D3C=D3B. It will further be noted that where is one formatted, again D1C=D1B and D3C=D3B. It will be still further noted that where is unformatted and comprises a mix of zero-bits and one-bits, that D1C will be different than D1B and D3C will be different than D3B, but that XOR'ing resulting chunk 136 with chunk 324 will return data equivalent to dchunk 316 in portion 350, although irrelevant portion 351 can be different, and that XOR'ing resulting chunk 136 with the relevant portions of dchunk 316, e.g., 350, will return data equivalent to chunk 324. As such, generation of chunk 136 based on communicating portion 350 and not communicating portion 351 can provide a viable data storage solution where convolution of data into chunk 136 can be deconvoluted to yield at least the relevant portions of the contributing chunks/dchunks.

Figure 4:
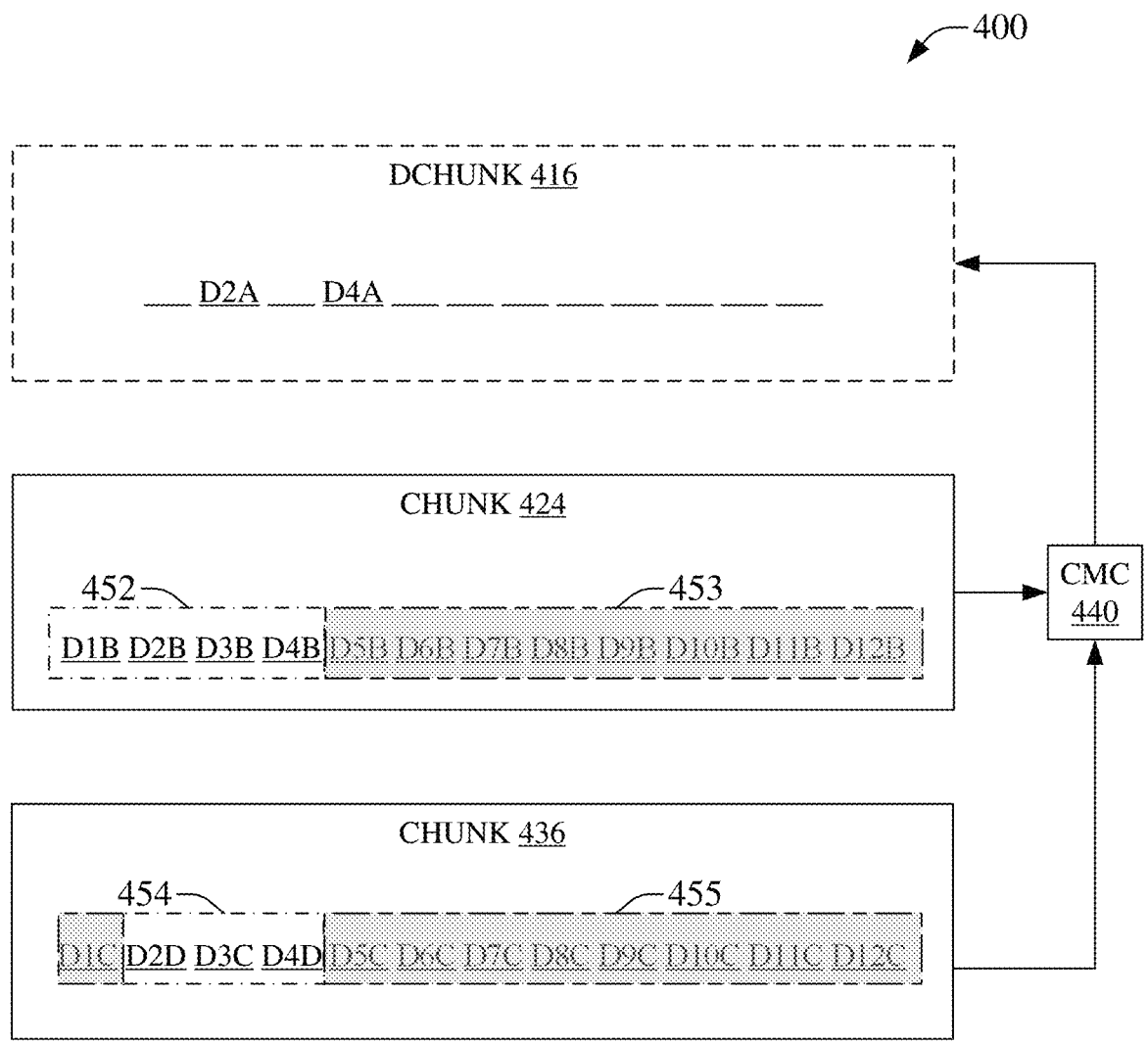
FIG. 4 illustrates an example system that can facilitate reducing network resource consumption associated with recovering a degraded chunk from a previously convolved chunk comprising a representation of the degraded chunk in a geographically diverse storage construct, in accordance with aspects of the subject disclosure.

FIG. 4 is an illustration of an example system 400, which can enable reducing network resource consumption associated with recovering a degraded chunk from a previously convolved chunk comprising a representation of the degraded chunk in a geographically diverse storage construct, in accordance with aspects of the subject disclosure. System 400 can comprise dchunk 416, chunk 424, and chunk 436. CMC 440 can enable communicating some, none, or all data representing the content of a chunk/dchunk, which can result in consuming fewer network resources than would be consumed by communicating full chunks/dchunks. In an aspect, dchunk 416 can comprise relevant data, e.g., at the second and fourth example fragments, and irrelevant user data, e.g., at the first, third, and fifth through twelfth example fragments. In an aspect, system 400 can comprise communicating data to enable recovery of relevant data stored in dchunk 416, e.g., where existing dchunk 416 becomes unavailable in a data storage system, at least the relevant portions of dchunk 416 can be recreated as illustrated in system 400.

In an example, CMC 440 can cause relevant portions of dchunk 416 to be regenerated by facilitating communication of corresponding portions of chunks 424 and 437. In this example, the relevant portions to be regenerated can comprise the second and fourth fragments of dchunk 416. Accordingly, corresponding portions of chunks 424 and 436 can be used to regenerate the second and fourth fragments of dchunk 416 without needing to communicate portions that can correspond to the non-relevant portions of dchunk 416. In the illustrated example of system 400, portions 452 and 454 of chunks 424 and 436 respectively can be employed to regenerate the second and fourth fragments of dchunk 416. As such, CMC 440 can prevent communication of portion 453, of chunk 424, and portion 455—including the greyed out first fragment, of chunk 436, thereby reducing the consumption of network resources. In this example, combining portion 452 with portion 454 can result in regenerating at least the second and fourth fragment of dchunk 416. In this example portion 452 can be represented as: D1B-D2B-D3B-D4B and portion 454 can be represented as D2D-D3C-D4D, wherein D2D was previous generated from an XOR of D2A and D2B, therefore D2D=(D2A$\oplus$D2B), and similarly, D4D=(D4A$\oplus$D4B). As such, D2DA$\oplus$D2B=D2A and D4D$\oplus$D4B=D4A. In an aspect, CMC 440 can indicate the portion 454 comprises second through fourth fragments such that where portion 454 is combined with portion 452, the first fragment of 452 is not combined with data from portion 454, and further, that the second through fourth fragments of 452 are combined with the first through third fragments of portion 454 because these fragments of the portions correspond to the relevant portions of dchunk 416 being regenerated. In some not illustrated embodiments, portion 452 can comprise fewer fragments and additional information indicating that the portion is fragment-shifted, e.g., that the portion can contain D2B-D3B-D4B rather than D1B-D2B-D3B-D4B, further yet reducing network resource consumption.

Figure 5:
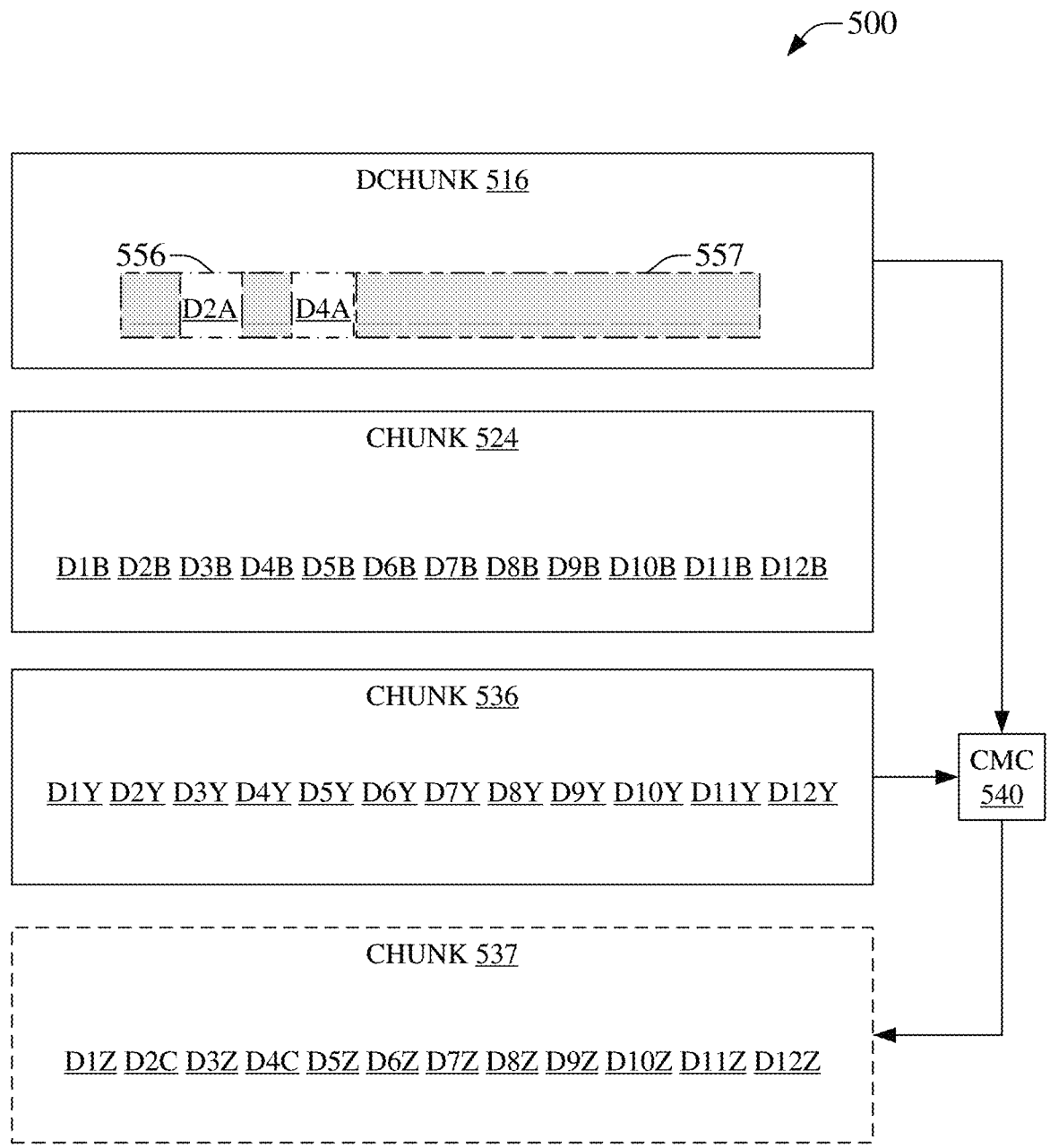
FIG. 5 is an illustration of an example system that can facilitate reducing network resource consumption associated with deleting data of a degraded chunk from a convolved chunk comprising a representation of the degraded chunk in a geographically diverse storage construct, in accordance with aspects of the subject disclosure.

FIG. 5 is illustrates example system 500, which can enable reducing network resource consumption associated with deleting data of a degraded chunk from a convolved chunk comprising a representation of the degraded chunk in a geographically diverse storage construct, in accordance with aspects of the subject disclosure. System 500 can comprise dchunk 516, chunk 524, and chunk 536, wherein chunk 536 can comprise information representing a convolution of chunk 524 and dchunk 536. System 500 can enable deletion of dchunk 516 and deletion of corresponding portions of information representing dchunk 516 residing in chunk 536. In an aspect, removing dchunk 516 type data from chunk 536 can result in chunk 537, e.g., chunk 537 can represent a modification of chunk 536, can be a new chunk replacing chunk 536, etc.

CMC 540 can enable communicating some, none, or all data representing the content of a chunk/dchunk, which can result in consuming fewer network resources than would be consumed by communicating full chunks/dchunks. In an aspect, dchunk 516 can comprise relevant data, e.g., at the second and fourth example fragments, and irrelevant user data, e.g., at the first, third, and fifth through twelfth example fragments. This relevant information can be reflected in corresponding fragments of chunk 536. In an aspect, system 500 can comprise communicating data representing relevant user data of dchunk 516 while communicating less non-relevant user data of dchunk 516 to enable deletion of dchunk 516 and corresponding representations of data in chunk 536, resulting in chunk 537.

In an example, CMC 540 can cause relevant portions of dchunk 516 to be communicated with less non-relevant portions of dchunk than might occur if all of dchunk 516 were communicated, thereby reducing network resource consumption. In an example, CMC 540 can cause communication of the first fragment and fourth fragment, represented by portion 556—both white data fragments having a dashed surrounding line, based on an example selection rule as disclosed herein, e.g., the portion 557, including the several greyed out fragments, need not be communicated, thus saving network resources in contrast com communicating all of dchunk 516.

It will be noted that D2Y can comprise a convolution of D2A and D2B, and D4Y can comprise a convolution of D4A and D4B. Where the convolution is commutative, e.g., XOR, etc., then where D2Z=an XOR of D2A, D2B, and possibly some other data, then (D2Z$\oplus$D2A)= ((_$\oplus$D2A$\oplus$D2B)$\oplus$D2A))=(_$\oplus$D2B)=D2C, and similarly, where D4Z=an XOR of D4A, D4B, and possibly some other data, then (D4Z$\oplus$D4A)=((_$\oplus$D4A$\oplus$D4B)$\oplus$D4A))= (_$\oplus$D4B)=D4C. It will be noted that where D2Z=an XOR of D2A and only D2B, then D2C=D2B, and where D4Z=an XOR of D4A and only D4B, then D4C=D4B. Accordingly, combining portion 556 of dchunk 516 with chunk 536 can result in chunk 537. In the simplest example, where chunk 536 represents only an XOR of chunk 524 and dchunk 516, then XOR'ing portion 556 with corresponding fragments of chunk 536 will yield chunk 537 as a replica of chunk 524, e.g., chunk 537=chunk 524. However where chunk 536 has been further convolved with other non-illustrated chunks, then chunk 537 can comprise the data of chunk 524 still convolved with the data of the other non-illustrated chunks absent the data of the second and fourth fragment of dchunk 516, upon which occurring, dchunk 516 can be deleted.

Figure 6:
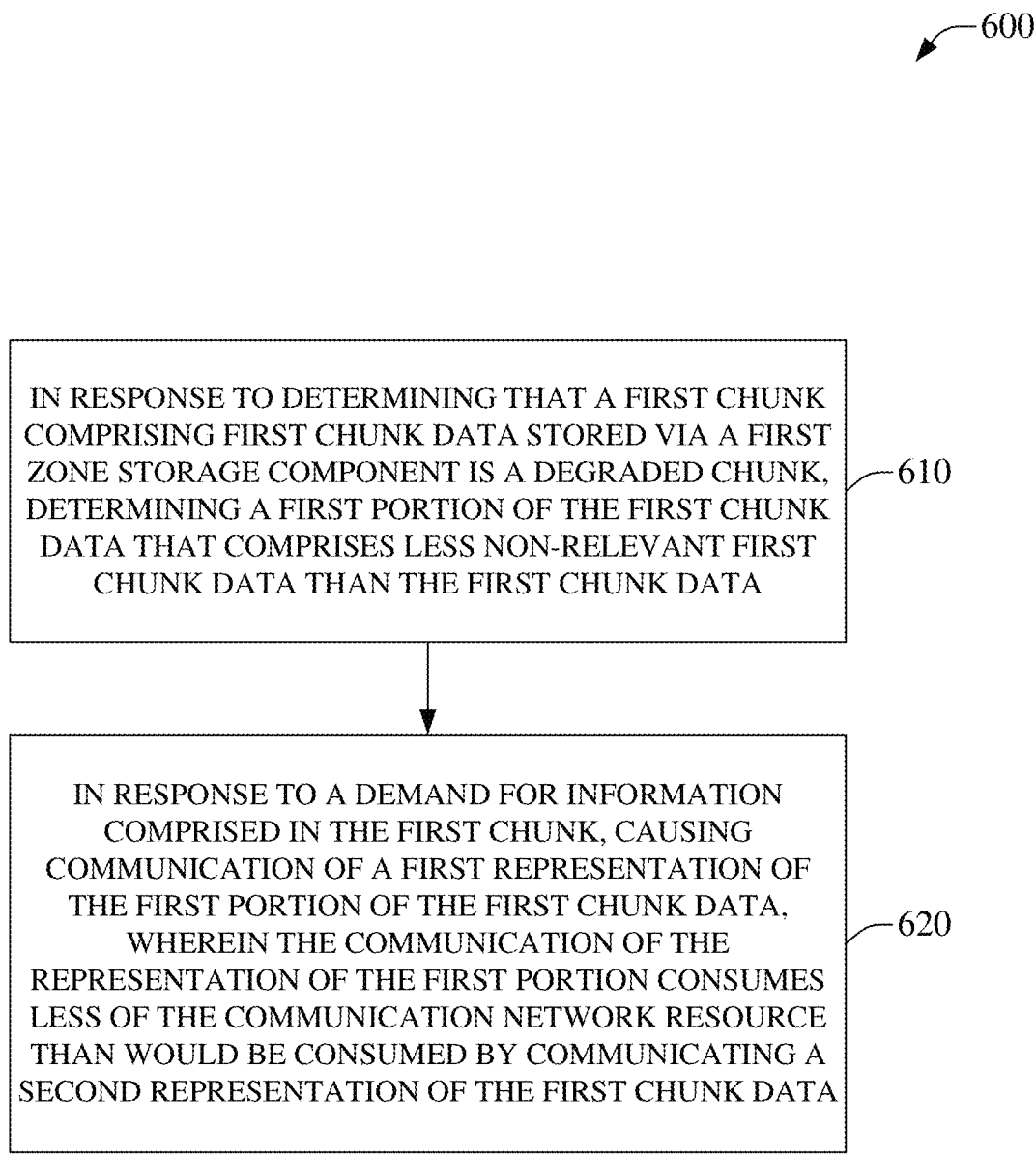
FIG. 6 is an illustration of an example method facilitating improved network resource consumption when communicating a representation of a degraded chunk in a geographically diverse storage construct, in accordance with aspects of the subject disclosure.
Figure 7:
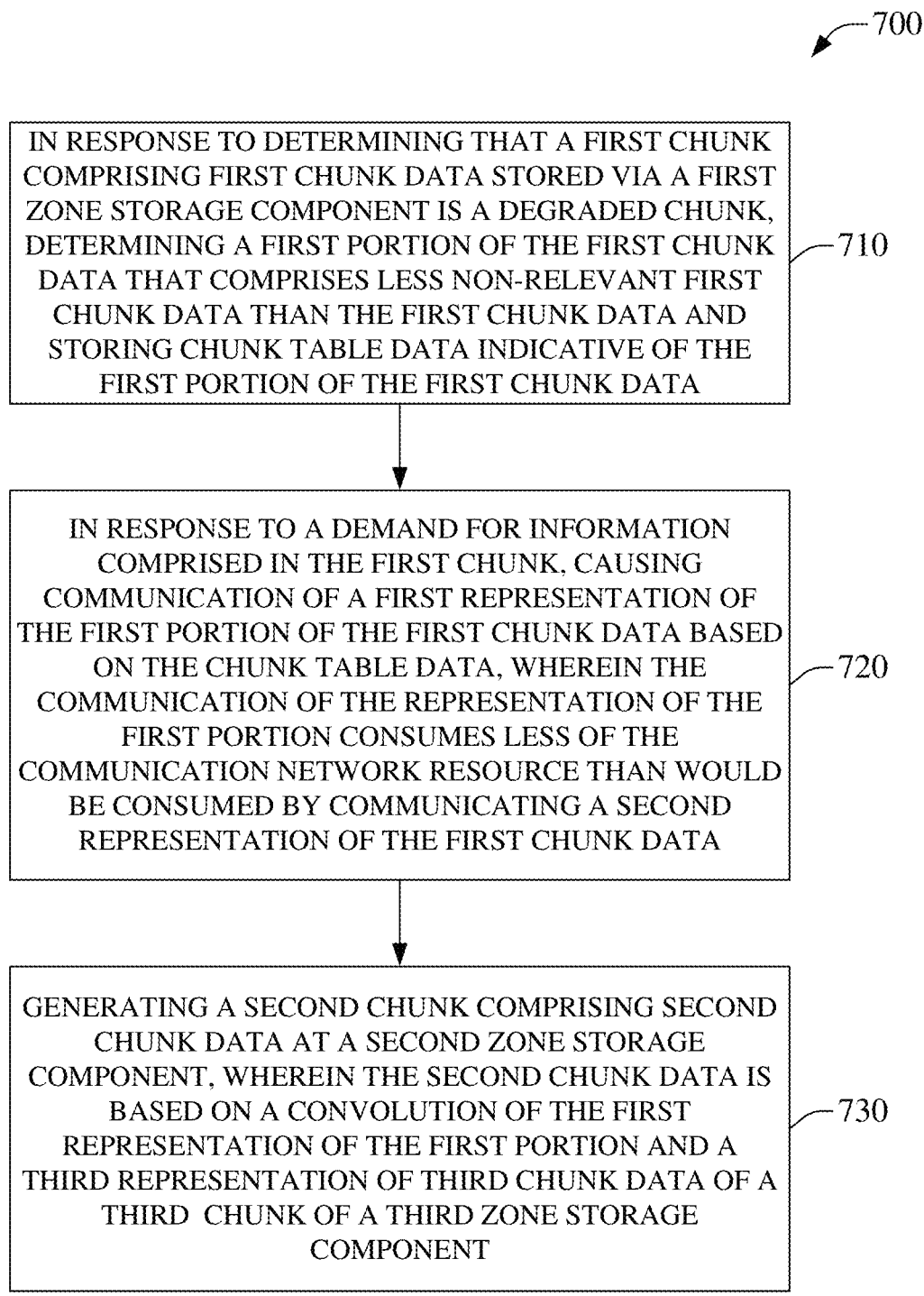
FIG. 7 is an illustration of an example method facilitating reducing network resource consumption when generating a convolved chunk comprising a representation of a degraded chunk in a geographically diverse storage construct, in accordance with aspects of the subject disclosure.
Figure 8:
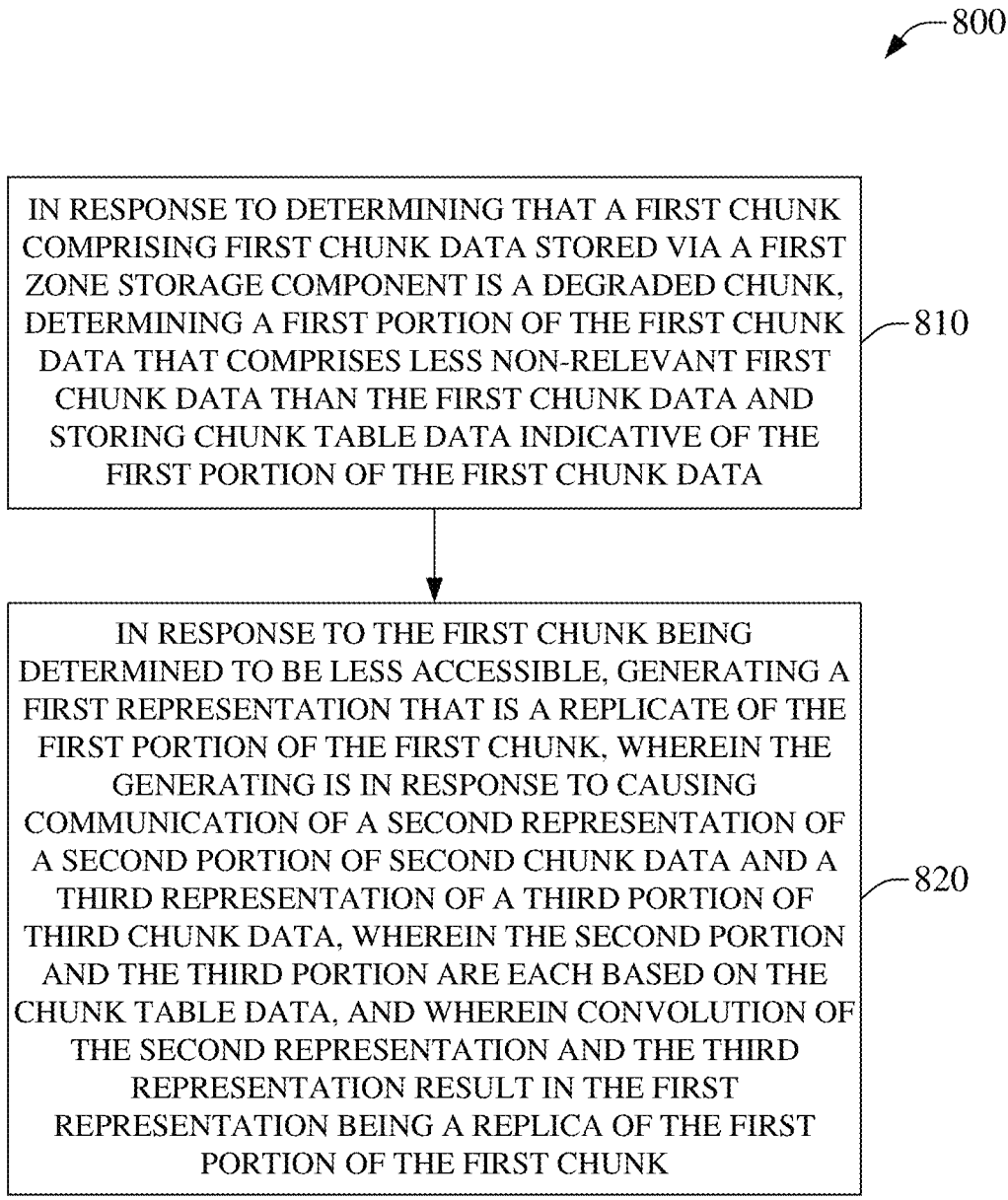
FIG. 8 illustrates an example method that enables improved network resource consumption when regenerating a degraded chunk from a convolved chunk comprising a representation of the degraded chunk in a geographically diverse storage construct, in accordance with aspects of the subject disclosure.

In view of the example system(s) described above, example method(s) that can be implemented in accordance with the disclosed subject matter can be better appreciated with reference to flowcharts in FIG. 6-FIG. 8. For purposes of simplicity of explanation, example methods disclosed herein are presented and described as a series of acts; however, it is to be understood and appreciated that the claimed subject matter is not limited by the order of acts, as some acts may occur in different orders and/or concurrently with other acts from that shown and described herein. For example, one or more example methods disclosed herein could alternatively be represented as a series of interrelated states or events, such as in a state diagram. Moreover, interaction diagram(s) may represent methods in accordance with the disclosed subject matter when disparate entities enact disparate portions of the methods. Furthermore, not all illustrated acts may be required to implement a described example method in accordance with the subject specification. Further yet, two or more of the disclosed example methods can be implemented in combination with each other, to accomplish one or more aspects herein described. It should be further appreciated that the example methods disclosed throughout the subject specification are capable of being stored on an article of manufacture (e.g., a computer-readable medium) to allow transporting and transferring such methods to computers for execution, and thus implementation, by a processor or for storage in a memory.

FIG. 6 is an illustration of an example method 600, which can facilitate improved network resource consumption when communicating a representation of a degraded chunk in a geographically diverse storage construct, in accordance with aspects of the subject disclosure. At 610, method 600 can comprise determining a first portion of first chunk data in response to determining that the first chunk data (i.e. first chunk) is a degraded chunk. In an aspect, the first portion of the first chunk data can comprise less non-relevant first chunk data than the first chunk data. As is disclosed elsewhere herein, a degraded chunk can comprise both relevant and non-relevant user data. As such, communicating the entire degraded chunk, e.g., including both the relevant and non-relevant data, can consume more network resources than communicating a portion of the degraded chunk that comprises less non-relevant data. The first portion, in an embodiment, can be selected to include the relevant data and less non-relevant data than the full degraded chunk. In an embodiment, the first portion can begin with a starting address of the data stored in the degraded chunk. As a first example, a first portion of dchunk 216 of FIG. 2 can include relevant data D1A-_-D3A, where the first fragment comprises relevant data. In another embodiment, the first portion can begin at an address of a first relevant fragment of the data stored in the degraded chunk. In a second example, a first portion of dchunk 316 of FIG. 3 can include relevant data _-D2A-_-D4A, even where the first fragment comprises non-relevant data. Moreover, as observed in these two examples, the first portions can comprise non-relevant fragments, e.g., the "_" fragments. In some embodiments, the first portion can comprise only relevant data, for example, as illustrated in FIG. 5 at dchunk 516 with portion 556, which example portion can exclude the non-relevant data 557, etc.

At 620, method 600 can comprise causing communication of the data comprised in the first portion in response to a demand for the information comprised in the first chunk. At this point method 600 can end. The demand for the first chunk data can be related to data operations of a geographically diverse storage system, as an example, a demand for the data of the first chunk for use in generating convolved chunk based on the first chunk and another chunk, for use in regenerating data related to a lost chunk, for use in deleting the first chunk and replicated data in other chunks, etc., can be responded to by providing the first portion determined at 610, e.g., providing the relevant data with less non-relevant data to reduce consumption of a network resource. To facilitate communication of less than all of the data of the first chunk, the first portion can comprise indexing information that can relate to how the first portion data can be employed in a geographically diverse storage construct. As an example, where chunks are of a standard size, then the first portion can comprise indexing data indicating where in a standard chunk the relevant fragments comprised in the degraded portion represented in the first portion relate to, such as indicating that for example in dchunk 316 of FIG. 3 where the first portion is determined to be D2A-_-D4A, then the indexing data can indicate that D2A corresponds to a second fragment and D4A corresponds to a fourth fragment, such that the portion can be properly employed in data operations such as convolution with a second and fourth fragment respectively of another chunk, etc.

FIG. 7 is an illustration of an example method 700, which can facilitate reducing network resource consumption when generating a convolved chunk comprising a representation of a degraded chunk in a geographically diverse storage construct, in accordance with aspects of the subject disclosure. At 710, method 700 can comprise determining a first portion of first chunk data in response to determining that the first chunk is a degraded chunk. Chunk table data can be stored, wherein the chunk table data can indicate information about the first portion of the first chunk data, e.g., memory locations for relevant and/or irrelevant portions of the first chunk that are determined to be comprised in the first portion of the first chunk data, fragment sizes, fragment start/stop memory addresses, etc. In an aspect, the first portion of the first chunk data can comprise less non-relevant first chunk data than the first chunk data. The degraded chunk, e.g., the first chunk being determined to comprise both relevant and non-relevant user data, etc., can be analyzed to determine the first portion thereof, e.g., via a selection rule, etc., such that communicating the portion of the degraded chunk can consume less network resources than communicating the entire degraded chunk, e.g., including both the relevant and non-relevant data. The first portion, in an embodiment, can be selected to include the relevant data and less non-relevant data than the full degraded chunk.

At 720, method 700 can comprise causing communication of a first representation of the data comprised in the first portion in response to a demand for the information comprised in the first chunk. The demand for the first chunk data can be related to data operations of a geographically diverse storage system, as an example, a demand for the data of the first chunk for use in generating convolved chunk based on the first chunk and another chunk, for use in regenerating data related to a lost chunk, for use in deleting the first chunk and replicated data in other chunks, etc., can be responded to by providing the first representation of the first portion determined at 710, e.g., providing the relevant data and less non-relevant data than are comprise in the first chunk data, thereby reducing consumption of a network resource. To facilitate communication of less than all of the data of the first chunk, the first portion can comprise indexing information that can relate to how the first portion data can be employed in a geographically diverse storage construct.

Method 700, at 730, can comprise generating a second chunk comprising second chunk data a second zone storage component, wherein the second chunk data is based on a convolution of the first representation of the first portion and a third representation of third chunk data of a third chunk. At this point method 700 can end. In an embodiment, the third chunk can be stored on a third zone storage component. As an example, in FIG. 1, a first representation can represent a first portion of data of dchunk 116 of first ZSC 110, a third representation can represent data of chunk 122 of second ZSC 120, and a convolution of the first and third representation can result in generation of chunk 136 stored at third ZSC 130.

FIG. 8 is an illustration of an example method 800, which can enable improved network resource consumption when regenerating a degraded chunk from a convolved chunk comprising a representation of the degraded chunk in a geographically diverse storage construct, in accordance with aspects of the subject disclosure. At 810, method 800 can comprise determining a first portion of first chunk data in response to determining that the first chunk is a degraded chunk. Chunk table data can be stored, wherein the chunk table data can indicate information about the first portion of the first chunk data, e.g., memory locations for relevant and/or irrelevant portions of the first chunk that are determined to be comprised in the first portion of the first chunk data, fragment sizes, fragment start/stop memory addresses, etc. In an aspect, the first portion of the first chunk data can comprise less non-relevant first chunk data than the first chunk data. The degraded chunk, e.g., the first chunk being determined to comprise both relevant and non-relevant user data, etc., can be analyzed to determine the first portion thereof, e.g., via a selection rule, etc., such that communicating the portion of the degraded chunk can consume less network resources than communicating the entire degraded chunk, e.g., including both the relevant and non-relevant data. The first portion, in an embodiment, can be selected to include the relevant data and less non-relevant data than the full degraded chunk.

At 820, method 800 can comprise generating a first representation that can be replicate of the first portion of the first chunk. This can occur in response to the first chunk being determined to be less accessible, e.g., the first chunk can be affected by a data loss event, such as a drive failure, ZSC failure, networking failure, etc. Where the first chunk can be less accessible or not accessible, a replacement chunk can be generated based on data comprised in another chunk, e.g., deconvolving a previously created convolved backup chunk that comprises a representation of first chunk data. Under the presently disclosed backup technology, the first chunk can have been previously convolved with another chunk to generate a convolved backup chunk, wherein the convolved data of said backup chunk comprises a representation of the first chunk data. Accordingly, the convolved backup chunk can be deconvolved to access the data representing the now less accessible first chunk.

In an aspect, the generating the first representation that is a replicate of the first portion of the first chunk can be in response to causing communication of a second portion of second chunk data and a third representation of a third portion of third chunk data. The second and third portion can each be selected, e.g., based on, the chunk table data. In an aspect, where, prior to the first chunk becoming less accessible, the first chunk is determined to be a degraded chunk, it can be determined that the first chunk comprises non-relevant user data, such that the first portion can be selected to comprise less non-relevant data. Information indicative of the first portion can be stored as chunk table data and the chunk table data can be used to select the second and third portions of the other chunks. By using the chunk table data to select the second and third portions, the regeneration of the first portion, e.g., after the first portion of the first chunk becomes less accessible, can be accomplished, albeit with the balance of the first chunk other than the first portion perhaps being different than it was in the first chunk. However, where the balance of the first chunk other than the first portion comprises only non-relevant user data, it can be understood that the balance of the first chunk other than the first portion is also non-relevant and therefore using the second and third portions provides sufficient user data to regenerate the relevant fragments and less non-relevant fragments of the first chunk according to the first portion. As an example, in FIG. 4, CMC 440 can employ second portion 452 and third portion 454 to regenerate at least the relevant portions of dchunk 416, e.g., '_-D2A-_-D5A'='D1B-D2B-D3B-D4B'⊕'D2D-D3C-D4D' where portion 454 is indexed appropriately:

D1B-D2B-D3B-D4B
⊕D2D-D3C-D4D=
'_-D2A-_-D5A,

Then the first fragment of the third portion, e.g., portion 454, can be XOR'ed, etc., with the second fragment of the second portion, e.g., portion 452, because third portion 454 does not comprise the first fragment, e.g., 'D1C' because it is not needed in regenerating a replica of dchunk 416 where the first fragment of dchunk 416 is a non-relevant fragment of user data, e.g., '_'. Accordingly, communicating second portion 452 and third portion 454 can consume fewer network resources than communicating all of chunk 424 and all of chunk 436, but can still enable regeneration of at least the relevant user data of dchunk 416. It will be noted that a non-relevant user data fragment of dchunk 416 can be created but may or may not match the original dchunk 416, e.g., where the third fragment of dchunk 416 is non-relevant user data, then deconvolving the third fragments of second portion 452 with the appropriately indexed second fragment of third portion 454, e.g., corresponding to the third fragment of chunk 436, can result in a data being present in the third fragment of a regenerate version of dchunk 416, however, where this fragment is already known to be non-relevant user data, the values of the regenerate third fragment of dchunk 416 are unimportant because they are also non-relevant regenerated user data.

Figure 9:
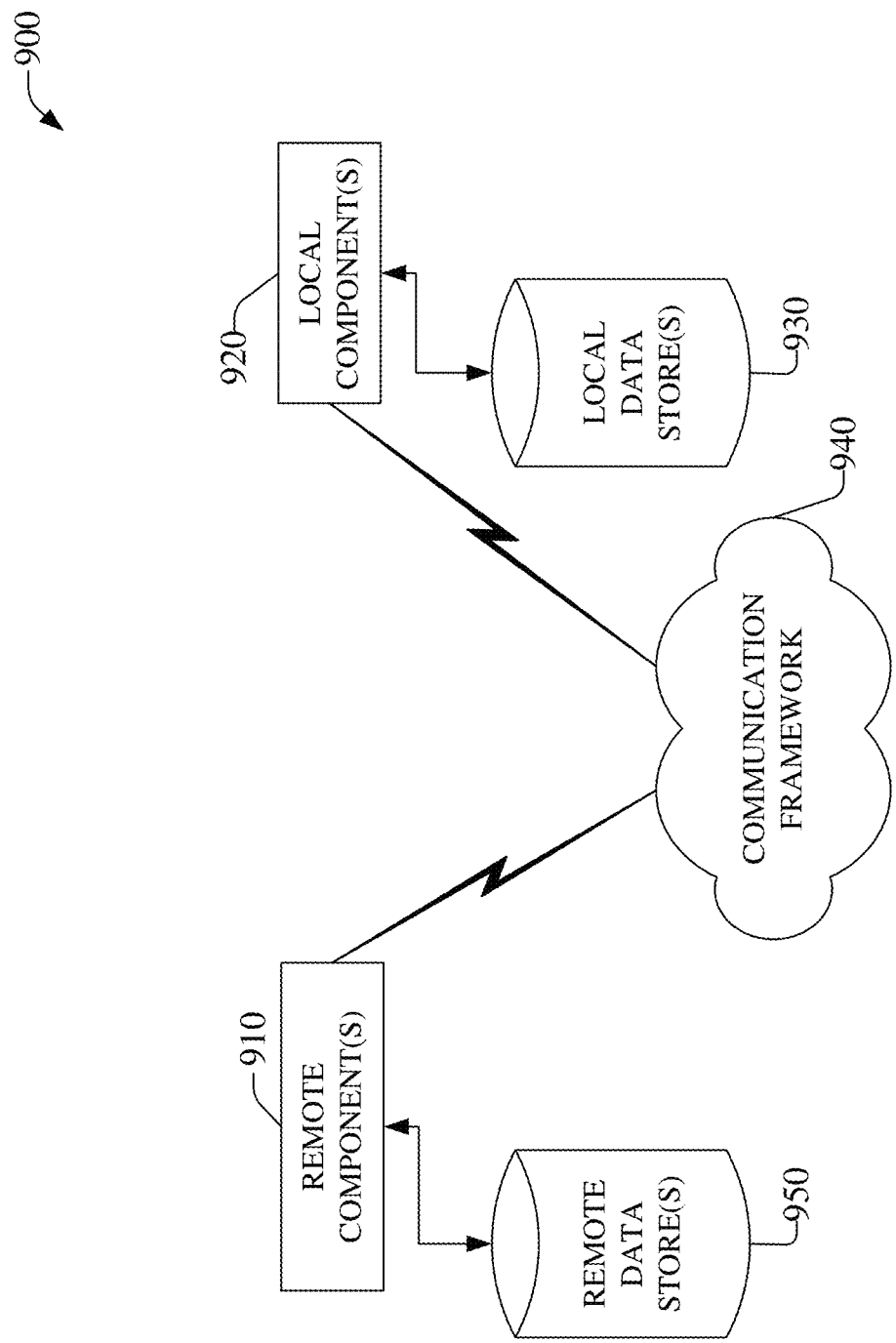
FIG. 9 depicts an example schematic block diagram of a computing environment with which the disclosed subject matter can interact.

FIG. 9 is a schematic block diagram of a computing environment 900 with which the disclosed subject matter can interact. The system 900 comprises one or more remote component(s) 910. The remote component(s) 910 can be hardware and/or software (e.g., threads, processes, computing devices). In some embodiments, remote component(s) 910 can be a remotely located ZSC connected to a local ZSC via communication framework 940. In an aspect the remotely located ZSC or local ZSC can be embodied in ZSCs 110, 120, 130, etc. In some embodiments, remote component(s) 910 can be a chunk table 142, etc., a chunk management component 140, etc., a rule store (not illustrated), etc. Communication framework 940 can comprise wired network devices, wireless network devices, mobile devices, wearable devices, radio access network devices, gateway devices, femtocell devices, servers, etc.

The system 900 also comprises one or more local component(s) 920. The local component(s) 920 can be hardware and/or software (e.g., threads, processes, computing devices). In some embodiments, local component(s) 920 can comprise a local ZSC connected to a remote ZSC via communication framework 940. In an aspect the remotely located ZSC or local ZSC can be embodied in ZSCs 110, 120, 130, etc. In some embodiments, local component(s) 920 can be a chunk table 142, etc., a chunk management component 140, etc., a rule store (not illustrated), etc.

One possible communication between a remote component(s) 910 and a local component(s) 920 can be in the form of a data packet adapted to be transmitted between two or more computer processes. Another possible communication between a remote component(s) 910 and a local component(s) 920 can be in the form of circuit-switched data adapted to be transmitted between two or more computer processes in radio time slots. The system 900 comprises a communication framework 940 that can be employed to facilitate communications between the remote component(s) 910 and the local component(s) 920, and can comprise an air interface, e.g., Uu interface of a UMTS network, via a long-term evolution (LTE) network, etc. Remote component(s) 910 can be operably connected to one or more remote data store(s) 950, such as a hard drive, solid state drive, SIM card, device memory, etc., that can be employed to store information on the remote component(s) 910 side of communication framework 940. Similarly, local component(s) 920 can be operably connected to one or more local data store(s) 930, that can be employed to store information on the local component(s) 920 side of communication framework 940. As an example, information corresponding to chunks stored on ZSCs can be communicated via communication framework 940 to other ZSCs of a storage network, e.g., to facilitate compression, storage in partial or complete chunks, deletion of chunks, etc., on/from a ZSC as disclosed herein. As another example, relevant/non-relevant user data information corresponding to a degraded chunk stored on ZSCs can be communicated via communication framework 940 to other ZSCs of a storage network, to a chunk table, e.g., chunk table 142, to a CMC, e.g., CMC 140, 24-, 340, 440, etc.

Figure 10:
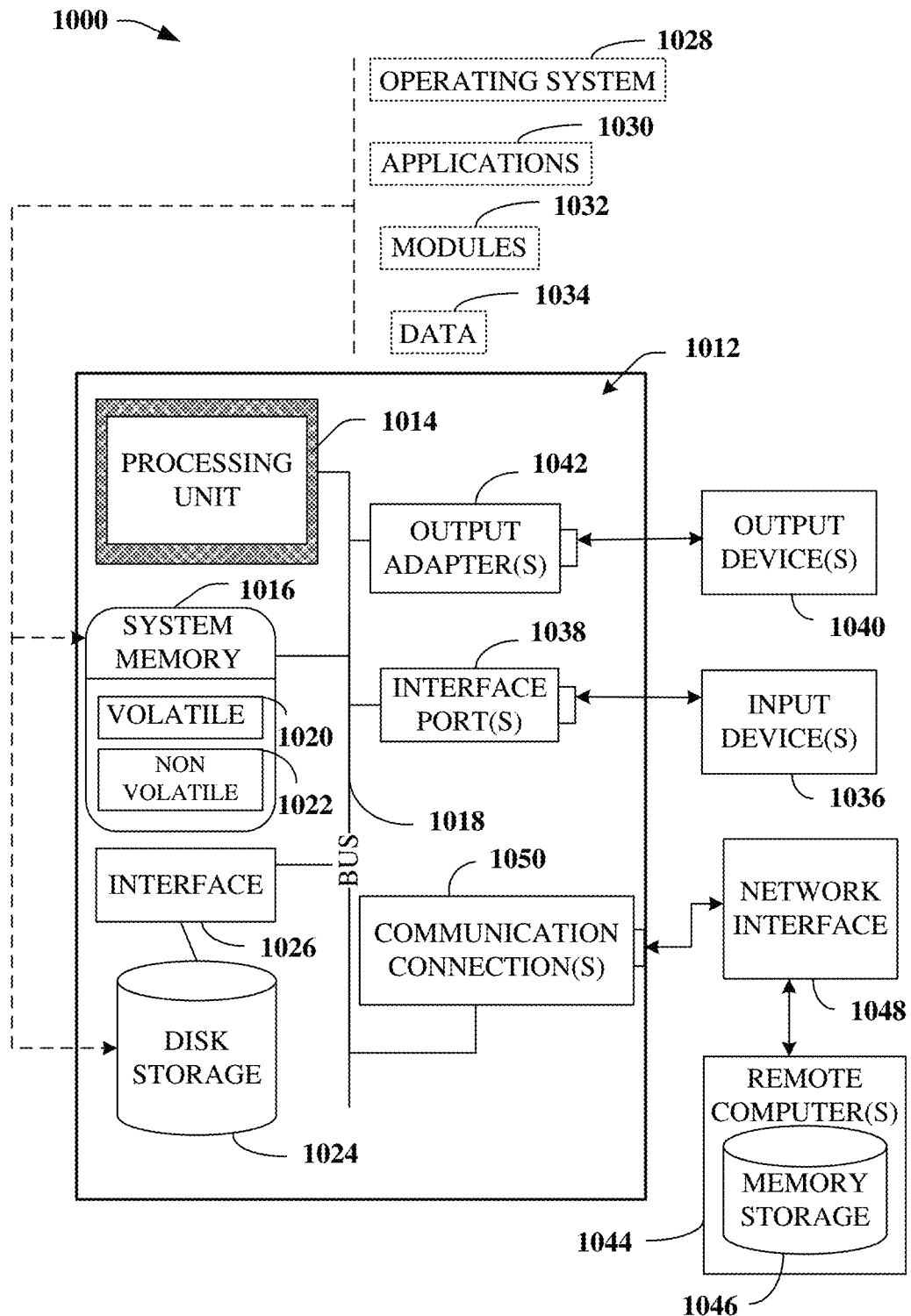
FIG. 10 illustrates an example block diagram of a computing system operable to execute the disclosed systems and methods in accordance with an embodiment.

In order to provide a context for the various aspects of the disclosed subject matter, FIG. 10, and the following discussion, are intended to provide a brief, general description of a suitable environment in which the various aspects of the disclosed subject matter can be implemented. While the subject matter has been described above in the general context of computer-executable instructions of a computer program that runs on a computer and/or computers, those skilled in the art will recognize that the disclosed subject matter also can be implemented in combination with other program modules. Generally, program modules comprise routines, programs, components, data structures, etc. that performs particular tasks and/or implement particular abstract data types.

In the subject specification, terms such as "store," "storage," "data store," data storage," "database," and substantially any other information storage component relevant to operation and functionality of a component, refer to "memory components," or entities embodied in a "memory" or components comprising the memory. It is noted that the memory components described herein can be either volatile memory or nonvolatile memory, or can comprise both volatile and nonvolatile memory, by way of illustration, and not limitation, volatile memory 1020 (see below), nonvolatile memory 1022 (see below), disk storage 1024 (see below), and memory storage 1046 (see below). Further, nonvolatile memory can be included in read only memory, programmable read only memory, electrically programmable read only memory, electrically erasable read only memory, or flash memory. Volatile memory can comprise random access memory, which acts as external cache memory. By way of illustration and not limitation, random access memory is available in many forms such as synchronous random access memory, dynamic random access memory, synchronous dynamic random access memory, double data rate synchronous dynamic random access memory, enhanced synchronous dynamic random access memory, SynchLink dynamic random access memory, and direct Rambus random access memory. Additionally, the disclosed memory components of systems or methods herein are intended to comprise, without being limited to comprising, these and any other suitable types of memory.

Moreover, it is noted that the disclosed subject matter can be practiced with other computer system configurations, comprising single-processor or multiprocessor computer systems, mini-computing devices, mainframe computers, as well as personal computers, hand-held computing devices (e.g., personal digital assistant, phone, watch, tablet computers, netbook computers, . . . ), microprocessor-based or programmable consumer or industrial electronics, and the like. The illustrated aspects can also be practiced in distributed computing environments where tasks are performed by remote processing devices that are linked through a communications network; however, some if not all aspects of the subject disclosure can be practiced on stand-alone computers. In a distributed computing environment, program modules can be located in both local and remote memory storage devices.

FIG. 10 illustrates a block diagram of a computing system 1000 operable to execute the disclosed systems and methods in accordance with an embodiment. Computer 1012, which can be, for example, comprised in a ZSC 110, 120, 130, etc., comprised in CMC 140, 240, 340, 440, etc., comprised in chunk table 142, 242, etc., or comprised in nearly any other component germane to the presently disclosed subject matter herein, can comprise a processing unit 1014, a system memory 1016, and a system bus 1018. System bus 1018 couples system components comprising, but not limited to, system memory 1016 to processing unit 1014. Processing unit 1014 can be any of various available processors. Dual microprocessors and other multiprocessor architectures also can be employed as processing unit 1014.

System bus 1018 can be any of several types of bus structure(s) comprising a memory bus or a memory controller, a peripheral bus or an external bus, and/or a local bus using any variety of available bus architectures comprising, but not limited to, industrial standard architecture, microchannel architecture, extended industrial standard architecture, intelligent drive electronics, video electronics standards association local bus, peripheral component interconnect, card bus, universal serial bus, advanced graphics port, personal computer memory card international association bus, Firewire (Institute of Electrical and Electronics Engineers 1194), and small computer systems interface.

System memory 1016 can comprise volatile memory 1020 and nonvolatile memory 1022. A basic input/output system, containing routines to transfer information between elements within computer 1012, such as during start-up, can be stored in nonvolatile memory 1022. By way of illustration, and not limitation, nonvolatile memory 1022 can comprise read only memory, programmable read only memory, electrically programmable read only memory, electrically erasable read only memory, or flash memory. Volatile memory 1020 comprises read only memory, which acts as external cache memory. By way of illustration and not limitation, read only memory is available in many forms such as synchronous random access memory, dynamic read only memory, synchronous dynamic read only memory, double data rate synchronous dynamic read only memory, enhanced synchronous dynamic read only memory, SynchLink dynamic read only memory, Rambus direct read only memory, direct Rambus dynamic read only memory, and Rambus dynamic read only memory.

Computer 1012 can also comprise removable/non-removable, volatile/non-volatile computer storage media. FIG. 10 illustrates, for example, disk storage 1024. Disk storage 1024 comprises, but is not limited to, devices like a magnetic disk drive, floppy disk drive, tape drive, flash memory card, or memory stick. In addition, disk storage 1024 can comprise storage media separately or in combination with other storage media comprising, but not limited to, an optical disk drive such as a compact disk read only memory device, compact disk recordable drive, compact disk rewritable drive or a digital versatile disk read only memory. To facilitate connection of the disk storage devices 1024 to system bus 1018, a removable or non-removable interface is typically used, such as interface 1026.

Computing devices typically comprise a variety of media, which can comprise computer-readable storage media or communications media, which two terms are used herein differently from one another as follows.

Computer-readable storage media can be any available storage media that can be accessed by the computer and comprises both volatile and nonvolatile media, removable and non-removable media. By way of example, and not limitation, computer-readable storage media can be implemented in connection with any method or technology for storage of information such as computer-readable instructions, program modules, structured data, or unstructured data. Computer-readable storage media can comprise, but are not limited to, read only memory, programmable read only memory, electrically programmable read only memory, electrically erasable read only memory, flash memory or other memory technology, compact disk read only memory, digital versatile disk or other optical disk storage, magnetic cassettes, magnetic tape, magnetic disk storage or other magnetic storage devices, or other tangible media which can be used to store desired information. In this regard, the term "tangible" herein as may be applied to storage, memory or computer-readable media, is to be understood to exclude only propagating intangible signals per se as a modifier and does not relinquish coverage of all standard storage, memory or computer-readable media that are not only propagating intangible signals per se. In an aspect, tangible media can comprise non-transitory media wherein the term "non-transitory" herein as may be applied to storage, memory or computer-readable media, is to be understood to exclude only propagating transitory signals per se as a modifier and does not relinquish coverage of all standard storage, memory or computer-readable media that are not only propagating transitory signals per se. Computer-readable storage media can be accessed by one or more local or remote computing devices, e.g., via access requests, queries or other data retrieval protocols, for a variety of operations with respect to the information stored by the medium. As such, for example, a computer-readable medium can comprise executable instructions stored thereon that, in response to execution, can cause a system comprising a processor to perform operations, comprising determining chunk table data, e.g., via CMC 14-440, etc., chunk table 142, 143, etc., wherein the chunk table data corresponds to a portion of a chunk that comprises fewer non-relevant fragments than is comprised in the whole chunk, and wherein the chunk table data is indicative of storage locations of the fragments of the chunk such that, in response to receiving a request for access to the chunk, the portion of the chunk can be communicated in lieu of the entire first chunk and, accordingly, fewer communication network resources can be consumed, as disclosed herein.

Communications media typically embody computer-readable instructions, data structures, program modules or other structured or unstructured data in a data signal such as a modulated data signal, e.g., a carrier wave or other transport mechanism, and comprises any information delivery or transport media. The term "modulated data signal" or signals refers to a signal that has one or more of its characteristics set or changed in such a manner as to encode information in one or more signals. By way of example, and not limitation, communication media comprise wired media, such as a wired network or direct-wired connection, and wireless media such as acoustic, RF, infrared and other wireless media.

It can be noted that FIG. 10 describes software that acts as an intermediary between users and computer resources described in suitable operating environment 1000. Such software comprises an operating system 1028. Operating system 1028, which can be stored on disk storage 1024, acts to control and allocate resources of computer system 1012. System applications 1030 take advantage of the management of resources by operating system 1028 through program modules 1032 and program data 1034 stored either in system memory 1016 or on disk storage 1024. It is to be noted that the disclosed subject matter can be implemented with various operating systems or combinations of operating systems.

A user can enter commands or information into computer 1012 through input device(s) 1036. In some embodiments, a user interface can allow entry of user preference information, etc., and can be embodied in a touch sensitive display panel, a mouse/pointer input to a graphical user interface (GUI), a command line controlled interface, etc., allowing a user to interact with computer 1012. Input devices 1036 comprise, but are not limited to, a pointing device such as a mouse, trackball, stylus, touch pad, keyboard, microphone, joystick, game pad, satellite dish, scanner, TV tuner card, digital camera, digital video camera, web camera, cell phone, smartphone, tablet computer, etc. These and other input devices connect to processing unit 1014 through system bus 1018 by way of interface port(s) 1038. Interface port(s) 1038 comprise, for example, a serial port, a parallel port, a game port, a universal serial bus, an infrared port, a Bluetooth port, an IP port, or a logical port associated with a wireless service, etc. Output device(s) 1040 use some of the same type of ports as input device(s) 1036.

Thus, for example, a universal serial busport can be used to provide input to computer 1012 and to output information from computer 1012 to an output device 1040. Output adapter 1042 is provided to illustrate that there are some output devices 1040 like monitors, speakers, and printers, among other output devices 1040, which use special adapters. Output adapters 1042 comprise, by way of illustration and not limitation, video and sound cards that provide means of connection between output device 1040 and system bus 1018. It should be noted that other devices and/or systems of devices provide both input and output capabilities such as remote computer(s) 1044.

Computer 1012 can operate in a networked environment using logical connections to one or more remote computers, such as remote computer(s) 1044. Remote computer(s) 1044 can be a personal computer, a server, a router, a network PC, cloud storage, a cloud service, code executing in a cloud-computing environment, a workstation, a microprocessor-based appliance, a peer device, or other common network node and the like, and typically comprises many or all of the elements described relative to computer 1012. A cloud computing environment, the cloud, or other similar terms can refer to computing that can share processing resources and data to one or more computer and/or other device(s) on an as needed basis to enable access to a shared pool of configurable computing resources that can be provisioned and released readily. Cloud computing and storage solutions can store and/or process data in third-party data centers which can leverage an economy of scale and can view accessing computing resources via a cloud service in a manner similar to a subscribing to an electric utility to access electrical energy, a telephone utility to access telephonic services, etc.

For purposes of brevity, only a memory storage device 1046 is illustrated with remote computer(s) 1044. Remote computer(s) 1044 is logically connected to computer 1012 through a network interface 1048 and then physically connected by way of communication connection 1050. Network interface 1048 encompasses wire and/or wireless communication networks such as local area networks and wide area networks. Local area network technologies comprise fiber distributed data interface, copper distributed data interface, Ethernet, Token Ring and the like. Wide area network technologies comprise, but are not limited to, point-to-point links, circuit-switching networks like integrated services digital networks and variations thereon, packet switching networks, and digital subscriber lines. As noted below, wireless technologies may be used in addition to or in place of the foregoing.

Communication connection(s) 1050 refer(s) to hardware/software employed to connect network interface 1048 to bus 1018. While communication connection 1050 is shown for illustrative clarity inside computer 1012, it can also be external to computer 1012. The hardware/software for connection to network interface 1048 can comprise, for example, internal and external technologies such as modems, comprising regular telephone grade modems, cable modems and digital subscriber line modems, integrated services digital network adapters, and Ethernet cards.

The above description of illustrated embodiments of the subject disclosure, comprising what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as those skilled in the relevant art can recognize.

In this regard, while the disclosed subject matter has been described in connection with various embodiments and corresponding Figures, where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

As it employed in the subject specification, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit, a digital signal processor, a field programmable gate array, a programmable logic controller, a complex programmable logic device, a discrete gate or transistor logic, discrete hardware components, or any combination thereof designed to perform the functions described herein. Processors can exploit nano-scale architectures such as, but not limited to, molecular and quantum-dot based transistors, switches and gates, in order to optimize space usage or enhance performance of user equipment. A processor may also be implemented as a combination of computing processing units.

As used in this application, the terms "component," "system," "platform," "layer," "selector," "interface," and the like are intended to refer to a computer-related entity or an entity related to an operational apparatus with one or more specific functionalities, wherein the entity can be either hardware, a combination of hardware and software, software, or software in execution. As an example, a component may be, but is not limited to being, a process running on a processor, a processor, an object, an executable, a thread of execution, a program, and/or a computer. By way of illustration and not limitation, both an application running on a server and the server can be a component. One or more components may reside within a process and/or thread of execution and a component may be localized on one computer and/or distributed between two or more computers. In addition, these components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or a firmware application executed by a processor, wherein the processor can be internal or external to the apparatus and executes at least a part of the software or firmware application. As yet another example, a component can be an apparatus that provides specific functionality through electronic components without mechanical parts, the electronic components can comprise a processor therein to execute software or firmware that confers at least in part the functionality of the electronic components.

In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. Moreover, articles "a" and "an" as used in the subject specification and annexed drawings should generally be construed to mean "one or more" unless specified otherwise or clear from context to be directed to a singular form. Moreover, the use of any particular embodiment or example in the present disclosure should not be treated as exclusive of any other particular embodiment or example, unless expressly indicated as such, e.g., a first embodiment that has aspect A and a second embodiment that has aspect B does not preclude a third embodiment that has aspect A and aspect B. The use of granular examples and embodiments is intended to simplify understanding of certain features, aspects, etc., of the disclosed subject matter and is not intended to limit the disclosure to said granular instances of the disclosed subject matter or to illustrate that combinations of embodiments of the disclosed subject matter were not contemplated at the time of actual or constructive reduction to practice.

Further, the term "include" is intended to be employed as an open or inclusive term, rather than a closed or exclusive term. The term "include" can be substituted with the term "comprising" and is to be treated with similar scope, unless otherwise explicitly used otherwise. As an example, "a basket of fruit including an apple" is to be treated with the same breadth of scope as, "a basket of fruit comprising an apple."

Furthermore, the terms "user," "subscriber," "customer," "consumer," "prosumer," "agent," and the like are employed interchangeably throughout the subject specification, unless context warrants particular distinction(s) among the terms. It should be appreciated that such terms can refer to human entities, machine learning components, or automated components (e.g., supported through artificial intelligence, as through a capacity to make inferences based on complex mathematical formalisms), that can provide simulated vision, sound recognition and so forth.

Aspects, features, or advantages of the subject matter can be exploited in substantially any, or any, wired, broadcast, wireless telecommunication, radio technology or network, or combinations thereof. Non-limiting examples of such technologies or networks comprise broadcast technologies (e.g., sub-Hertz, extremely low frequency, very low frequency, low frequency, medium frequency, high frequency, very high frequency, ultra-high frequency, super-high frequency, extremely high frequency, terahertz broadcasts, etc.); Ethernet; X.25; powerline-type networking, e.g., Powerline audio video Ethernet, etc.; femtocell technology; Wi-Fi; worldwide interoperability for microwave access; enhanced general packet radio service; second generation partnership project (2G or 2GPP); third generation partnership project (3G or 3GPP); fourth generation partnership project (4G or 4GPP); long term evolution (LTE); fifth generation partnership project (5G or 5GPP); third generation partnership project universal mobile telecommunications system; third generation partnership project 2; ultra mobile broadband; high speed packet access; high speed downlink packet access; high speed uplink packet access; enhanced data rates for global system for mobile communication evolution radio access network; universal mobile telecommunications system terrestrial radio access network; or long term evolution advanced. As an example, a millimeter wave broadcast technology can employ electromagnetic waves in the frequency spectrum from about 30 GHz to about 300 GHz. These millimeter waves can be generally situated between microwaves (from about 1 GHz to about 30 GHz) and infrared (IR) waves, and are sometimes referred to extremely high frequency (EHF). The wavelength ($\lambda$) for millimeter waves is typically in the 1-mm to 10-mm range.

The term "infer" or "inference" can generally refer to the process of reasoning about, or inferring states of, the system, environment, user, and/or intent from a set of observations as captured via events and/or data. Captured data and events can include user data, device data, environment data, data from sensors, sensor data, application data, implicit data, explicit data, etc. Inference, for example, can be employed to identify a specific context or action, or can generate a probability distribution over states of interest based on a consideration of data and events. Inference can also refer to techniques employed for composing higher-level events from a set of events and/or data. Such inference results in the construction of new events or actions from a set of observed events and/or stored event data, whether the events, in some instances, can be correlated in close temporal proximity, and whether the events and data come from one or several event and data sources. Various classification schemes and/or systems (e.g., support vector machines, neural networks, expert systems, Bayesian belief networks, fuzzy logic, and data fusion engines) can be employed in connection with performing automatic and/or inferred action in connection with the disclosed subject matter.

What has been described above includes examples of systems and methods illustrative of the disclosed subject matter. It is, of course, not possible to describe every combination of components or methods herein. One of ordinary skill in the art may recognize that many further combinations and permutations of the claimed subject matter are possible. Furthermore, to the extent that the terms "includes," "has," "possesses," and the like are used in the detailed description, claims, appendices and drawings such terms are intended to be inclusive in a manner similar to the term "comprising" as "comprising" is interpreted when employed as a transitional word in a claim.

What is claimed is:

1. A system, comprising:
    a processor; and
    a memory that stores executable instructions that, when executed by the processor, facilitate performance of operations, comprising:
        determining a first portion of a first chunk for employment in an operation associated with replication, wherein the first chunk comprises at least one non-relevant fragment for exclusion from the operation and at least one relevant fragment for inclusion in the operation, the first chunk is stored on a first storage device in a first zone of a geographically diverse data storage system, and the first portion is less than an entirety of the first chunk and comprises the at least one relevant fragment; and
        in response to receiving a request for access to the first chunk related to the operation, causing communication of a first representation of the first portion of the first chunk to at least one other storage device of the geographically diverse data storage system that will perform the operation, wherein the communication of the first representation of the first portion consumes fewer communication network resources than communicating a full representation of the first chunk, wherein the operation is a regeneration operation resulting in regeneration of the first representation from a second representation of a second portion of a second chunk and a third representation of a third portion of a third chunk, and wherein the second chunk comprises the first representation via a convolution with the third chunk.

2. The system of claim, further comprising performing another operation associated with the replication, wherein the other operation comprises a convolving operation resulting in generating a fourth representation of a fourth chunk, and wherein the fourth representation comprises the first representation via a convolution with a fifth representation of a fifth chunk.

3. The system of claim 1, wherein the second chunk is stored, upon generation, at a second storage device of a second zone of the geographically diverse data storage system, and wherein the third chunk is stored at a third storage device of a third zone of the geographically diverse data storage system.

4. The system of claim 1, further comprising performing another operation associated with the replication, wherein the other operation comprises a deleting operation resulting in deletion of the first representation from a fourth representation of a fourth chunk, and wherein the fourth representation comprises the first representation via a convolution with a fifth representation of a fifth chunk.

5. The system of claim 1, wherein the first portion is a contiguous portion of the first chunk comprising the at least one relevant fragment.

6. The system of claim 5, wherein the first portion comprises some of the at least one non-relevant fragment.

7. The system of claim 1, wherein the at least one relevant fragment comprises at least two relevant fragments, and the first portion comprises a non-contiguous portion of the first chunk comprising only the at least two relevant fragments.

8. The system of claim 1, wherein information describing the at least one non-relevant fragment and at least one relevant fragment is stored in a chunk table that is stored, at least in part, on the first storage device of the geographically diverse data storage system and is communicatively coupled to the processor.

9. The system of claim 1, wherein the first representation comprises index information for the at least one relevant fragment with respect to the first chunk.

10. A method, comprising:
    determining, by a system comprising a processor a first portion of a first chunk for employment in an operation associated with replication, wherein the first chunk comprises at least one non-relevant fragment for exclusion from the operation and at least one relevant fragment for inclusion in the operation, the first chunk is stored on a first storage device in a first zone of a geographically diverse data storage system, and the first portion is less than an entirety of the first chunk and comprises the at least one relevant fragment; and in response to receiving a request for access to the first chunk related to the operation, causing, by the system, communication of a first representation of the first portion of the first chunk to at least one other storage device of the geographically diverse data storage system determined to be able to perform the operation, wherein the communication of the first representation of the first portion consumes fewer communication network resources than would be consumed by communicating a full representation of the first chunk, wherein the operation is a regeneration operation resulting in regeneration of the first representation from a second representation of a second portion of a second chunk and a third representation of a third portion of a third chunk, and wherein the second chunk comprises the first representation via a convolution with the third chunk.

11. The method of claim 10, further comprising a generating operation resulting in generating another chunk based on convolving the first representation of the first portion with another representation of another portion of another chunk stored on another storage device of the geographically diverse data storage system.

12. The method of claim 10, further comprising a deleting operation resulting in deleting data corresponding to the first representation of the first portion from another chunk that is based on a convolution of a fourth portion of the first chunk with a fifth portion of a second chunk stored on a second storage device of the geographically diverse data storage system.

13. The method of claim 10, further comprising a recovery operation resulting in generating a copy of the first representation of the first portion, wherein generating the copy is based on deconvolving a fourth chunk stored on another storage device of the geographically diverse data storage system, and wherein the fourth chunk comprises data representative of at least the first portion of the first chunk convolved with a fifth portion of a fifth chunk.

14. The method of claim 10, wherein the first portion is a contiguous portion of the first chunk comprising the at least one relevant fragment.

15. The method of claim 10, wherein the at least one relevant fragment comprises at least two relevant fragments, and the first portion comprises a non-contiguous portion of the first chunk comprising only the at least two relevant fragments.

16. A non-transitory machine-readable medium, comprising executable instructions that, when executed by a processor, facilitate performance of operations, comprising:

determining a first portion of a first chunk for employment in an operation associated with replication, wherein the chunk comprises at least one non-relevant fragment for exclusion from the operation and at least one relevant fragment for inclusion in the operation, the first chunk is stored on a first storage device in a first zone of a geographically diverse data storage system, and the first portion is less than an entirety of the first chunk and comprises the at least one relevant fragment; and in response to receiving a request for access to the first chunk related to the operation, initiating communication of a representation of the first portion of the first chunk to at least one other storage device of the geographically diverse data storage system that is to perform the operation, wherein the communication of the representation of the first portion consumes fewer communication network resources relative to communicating a full representation of the first chunk, wherein the operation is a regeneration operation resulting in regeneration of the first representation from a second representation of a second portion of a second chunk and a third representation of a third portion of a third chunk, and wherein the second chunk comprises the first representation via a convolution with the third chunk.

17. The non-transitory machine-readable medium of claim 16, wherein the first portion of the first chunk does not comprise any of the at least one non-relevant fragment.

18. The non-transitory machine-readable medium of claim 16, wherein the first portion of the first chunk comprises less than all of the at least one non-relevant fragment.

19. The non-transitory machine-readable medium of claim 16, wherein the first portion is a contiguous portion of the first chunk comprising the at least one relevant fragment.

20. The non-transitory machine-readable medium of claim 16, wherein the at least one relevant fragment comprises at least two relevant fragments, and the first portion comprises a non-contiguous portion of the first chunk comprising only the at least two relevant fragments.

* * * * *